United States Patent
Putterman et al.

(10) Patent No.: US 7,603,022 B2
(45) Date of Patent: Oct. 13, 2009

(54) NETWORKED PERSONAL VIDEO RECORDING SYSTEM

(75) Inventors: Daniel Putterman, San Francisco, CA (US); Brad Dietrich, San Francisco, CA (US); Jeremy Toeman, San Francisco, CA (US); Pedro Freitas, San Francisco, CA (US); Ludovic Legrand, San Francisco, CA (US); Shawn McCaffrey, Belmont, CA (US); James Grimm, San Francisco, CA (US); Lijia Jin, Hayward, CA (US); Paul Novaes, San Mateo, CA (US)

(73) Assignee: Macrovision Corporation, Santa Clara, CA (US)

( * ) Notice: Subject to any disclaimer, the term of this patent is extended or adjusted under 35 U.S.C. 154(b) by 934 days.

(21) Appl. No.: 10/613,470

(22) Filed: Jul. 2, 2003

(65) Prior Publication Data

US 2005/0002640 A1  Jan. 6, 2005

(51) Int. Cl.
*H04N 5/91* (2006.01)
*H04N 7/00* (2006.01)
*H04N 5/00* (2006.01)
*H04N 7/18* (2006.01)

(52) U.S. Cl. .............................. 386/46; 386/1; 386/45; 386/125; 386/126; 725/74; 725/76; 725/78; 725/80; 725/81; 725/82; 725/85

(58) Field of Classification Search ................. 386/1, 386/45, 46, 125–126; 725/74, 76, 78, 80–83, 725/85
See application file for complete search history.

(56) References Cited

U.S. PATENT DOCUMENTS

| | | | |
|---|---|---|---|
| 5,414,455 A * | 5/1995 | Hooper et al. | 725/88 |
| 5,841,938 A * | 11/1998 | Nitta et al. | 386/68 |
| 6,002,394 A | 12/1999 | Schein et al. | |
| 6,118,493 A | 9/2000 | Duhault et al. | |
| 6,414,725 B1 | 7/2002 | Clarin et al. | |
| 6,470,319 B1 | 10/2002 | Ryan | |
| 6,744,967 B2 | 6/2004 | Kaminski et al. | |
| 6,748,481 B1 | 6/2004 | Parry et al. | |
| 6,857,130 B2 * | 2/2005 | Srikantan et al. | 725/93 |
| 6,977,897 B1 * | 12/2005 | Nelson et al. | 370/235 |
| 7,089,321 B2 * | 8/2006 | Hayashi | 709/237 |
| 7,089,348 B2 | 8/2006 | Parry et al. | |

(Continued)

OTHER PUBLICATIONS

Article: "Automatic Windows 98/ME TCP/IP Addressing without a DHCP Server" Oct. 20, 2000.

(Continued)

*Primary Examiner*—Thai Tran
*Assistant Examiner*—Daquan Zhao
(74) *Attorney, Agent, or Firm*—Andy T. Pho; Rovi Cororaation

(57) ABSTRACT

A networked personal video recording ("PVR") system couples a plurality of clients to one or more PVR media servers over a network. One or more PVR media servers include television tuners to tune television signals. A storage medium buffers the television signals to implement PVR functionality. For example, the PVR media server records television programs for clients. Clients are assigned to television tuners, and the clients display television programs received at the assigned tuner. The network transfers the buffered television signals to the clients.

21 Claims, 15 Drawing Sheets

U.S. PATENT DOCUMENTS

| | | | |
|---|---|---|---|
| 7,130,623 B2 * | 10/2006 | Kirkeby et al. | 455/420 |
| 7,139,868 B2 | 11/2006 | Parry et al. | |
| 2002/0010917 A1 | 1/2002 | Srikantan et al. | |
| 2003/0154493 A1 | 8/2003 | Kagle | |
| 2004/0218905 A1 * | 11/2004 | Green et al. | 386/83 |
| 2004/0221302 A1 | 11/2004 | Ansari et al. | |
| 2004/0268407 A1 | 12/2004 | Sparrell et al. | |
| 2005/0028208 A1 | 2/2005 | Ellis et al. | |
| 2005/0283547 A1 | 12/2005 | Parry et al. | |
| 2006/0179462 A1 | 8/2006 | Willame et al. | |
| 2007/0067800 A1 | 3/2007 | Wachtfogel et al. | |
| 2007/0199030 A1 | 8/2007 | Ellis et al. | |

OTHER PUBLICATIONS

U.S. Appl. No. 10/613,401, filed Jul. 2, 2003, Daniel Putterman.
U.S. Appl. No. 10/613,400, filed Jul. 2, 2003, Daniel Putterman.
U.S. Appl. No. 10/613,999, filed Jul. 2, 2003, Daniel Putterman.
U.S. Appl. No. 10/613,470, filed Jul. 2, 2003, Daniel Putterman.

* cited by examiner

NETWORKED PERSONAL VIDEO RECORDING SYSTEM

BACKGROUND OF THE INVENTION

1. Field of the Invention

The present invention is directed toward the field of video recording, and more particularly toward a networked personal video recording system.

2. Art Background

Typically, a personal video recorder ("PVR") includes a storage device, such as a hard disk drive, and a television input. Similar to a video cassette recorder, the PVR system permits a user to record television programming. Specifically, the PVR system stores a digital representation of television signals on the storage device for subsequent replay by the user. The PVR system also buffers live television. For this application, television signals are stored on the storage device and output to a television for viewing by a user. The function of buffering television permits a user to seemingly manipulate live television. For example, a user may pause, rewind, and, to a limited extent, fast forward the live television signal. Due to the numerous functions and features, PVR systems have become very popular. However, these PVR systems typically operate on a signal television signal for subsequent display on a single television. As such, it is desirable to develop a PVR system that effectively integrates one or more television inputs with a network of televisions.

SUMMARY OF THE INVENTION

A networked personal video recording ("PVR") system couples a plurality of clients to one or more PVR media servers over a network. A PVR media server receives a plurality of television signals, and includes television tuners to tune each of the television signals. In one embodiment, the PVR media server comprises a plurality of tuners located in a single PVR media server. In other embodiments, the tuners are located in multiple PVR media servers. A storage medium buffers the television signals to implement PVR functionality. Clients are assigned to television tuners, and the clients display television programs received at the assigned tuner. The network transfers the buffered television signals to the clients.

In one embodiment, the PVR media server records at least one television program for the client. To record a program, the system assigns a tuner to the client, allocates space on the storage medium to record the television program, and stores the television signal on the storage medium during a time scheduled for the television program. The system also resolves any conflicts that arise in assigning available tuners for recording television programs. In one embodiment, the system determines whether one of the tuners is available to receive the television signal. If so, the system assigns the tuner to receive the television signal. If not, the system determines whether there are any tuners potentially available, and queries clients assigned to the tuners to determine whether the clients desire to cancel recordation of the television program. If the clients do not cancel, the system assigns a tuner to receive the television signal for recordation of the television program.

DETAILED DESCRIPTION

Figure 1:
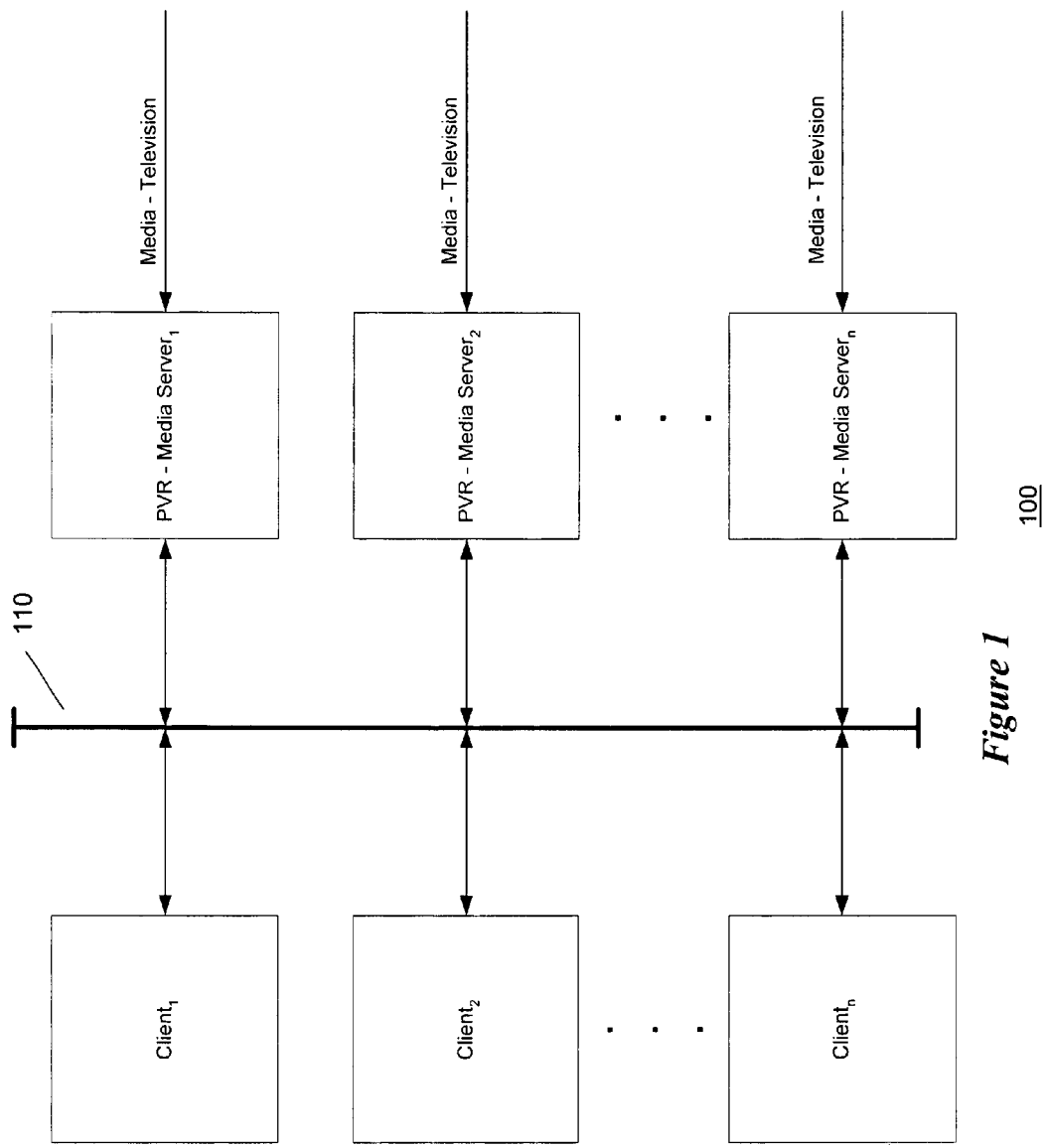
FIG. 1 is a block diagram illustrating one embodiment for the networked PVR system of the present invention.

FIG. 1 is a block diagram illustrating one embodiment for the networked PVR system of the present invention. For this embodiment, a home entertainment system includes "n" clients and "m" personal video recording ("PVR")—media servers (i.e., "n" and "m" are any integer values greater than or equal to one). A client, as used herein, is any device that plays back media. For example, a client may comprise a television to playback video and live television. A server, as used herein, connotes any device that stores or acquires media. A PVR-media server connotes any device that delivers video to the network, including a device that acquires television signals and buffers television signals for viewing by the clients. For example, a PVR-media server may comprise a device with storage, designed specifically to minimize cost or a PVR-media server may comprise a personal computer.

As shown in FIG. 1, different types of media, including television signals, are input to each PVR-media server. The PVR-media servers may store media, including audio and video, for access by the clients. In addition, the PVR-media servers buffer live television. Each client (e.g., $client_1$, $client_2$ and $client_n$) may access media stored or buffered on the PVR-media servers via network 110. Network 110 may comprise any type of network, including wireless networks. For example, network 110 may comprise networks implemented in accordance with standards, such as IEEE 802.3, Ethernet 10/100 on Category 5, HPNA, Home Plug, IEEE 802.11x, IEEE 1394, and USB 1.1/2.0.

The networked system 100, shown in FIG. 1, may be implemented in a residence. For example, each client may consist of a television for viewing stored video and television. Such an example home system may include a client television located in the living room, one or more client televisions located in bedrooms, and a client television located in the kitchen. In general, system 100 permits any client to playback media (e.g., video) stored or acquired through any of the PVR-media servers. The PVR-media servers may be configured to acquire television signals from different sources. For example, PVR-media server, may acquire a television signal from a satellite television system, whereas PVR-media server$_2$ may acquire a television signal from a cable television system. A PVR-media server includes permanent storage (e.g., hard disk drive) and at least one television tuner. Thus, system 100 permits any client to access media from any tuner or media stored on any PVR-media server.

Figure 2:
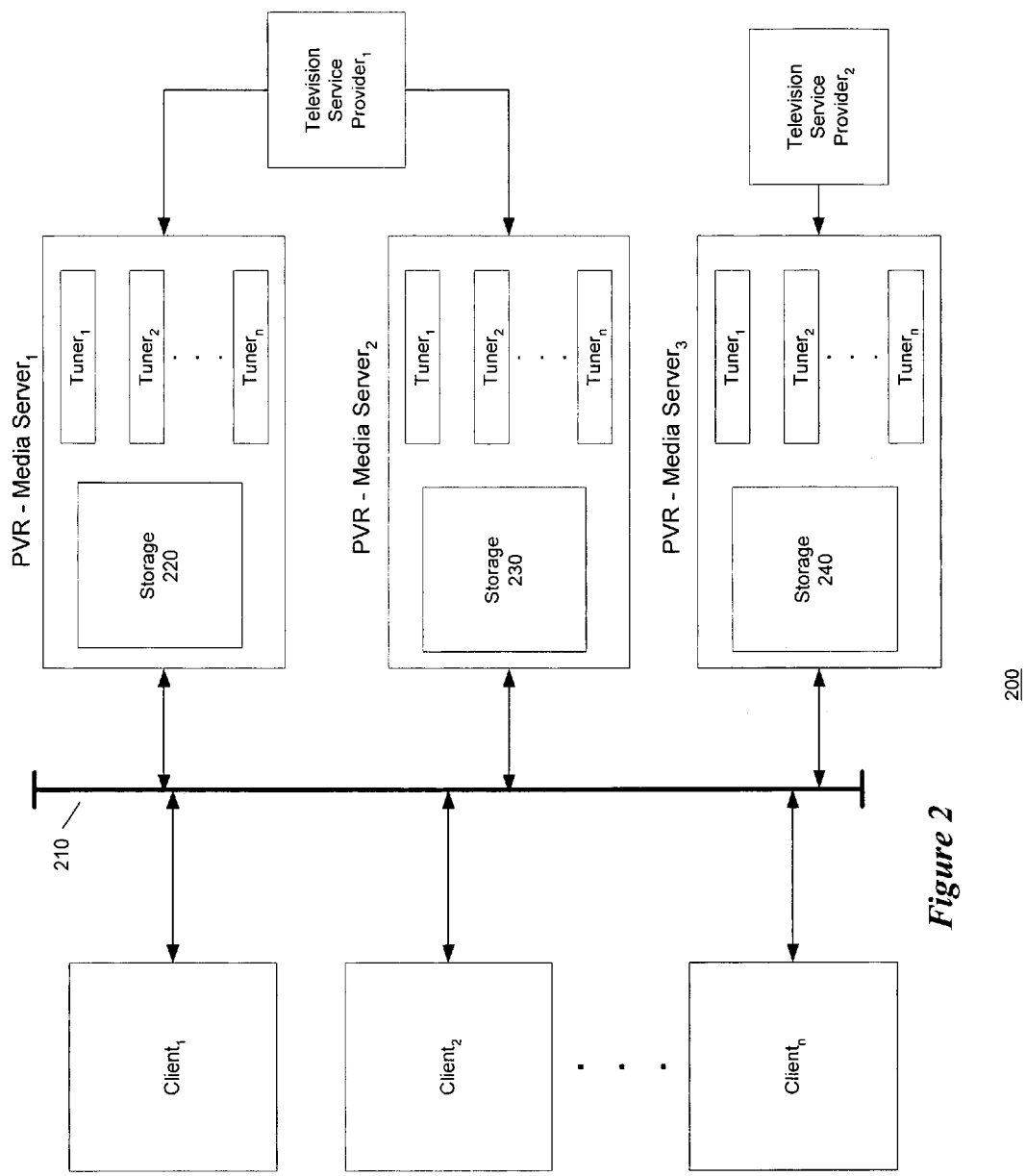
FIG. 2 is a block diagram illustrating one embodiment for the networked PVR system of the present invention.

FIG. 2 is a block diagram illustrating one embodiment for the networked PVR system of the present invention. Similar to system 100 of FIG. 1, system 200 includes "n" clients, including at least two televisions. For this example system, there are three PVR-media servers (PVR-media server$_1$, PVR-media server$_2$, and PVR-media server$_3$). The clients access media (e.g., video) through network 210. Each PVR-media server includes storage (220, 230 and 240) and "n" tuners (i.e., "n" represents any integer greater than or equal to one). The PVR-media servers receive a television signal. For this example, PVR-media server, and PVR-media server$_2$ receive a signal from television service provider$_1$, and PVR-media server$_3$ receives a television signal from television service provider$_2$. Under this configuration, any client (i.e., client$_1$, client$_2$, and clients) may receive an output video signal demodulated by any tuner (i.e., any one of "n" tuners from PVR-media server$_1$, PVR-media server$_2$, and PVR-media server$_3$).

Figure 3:
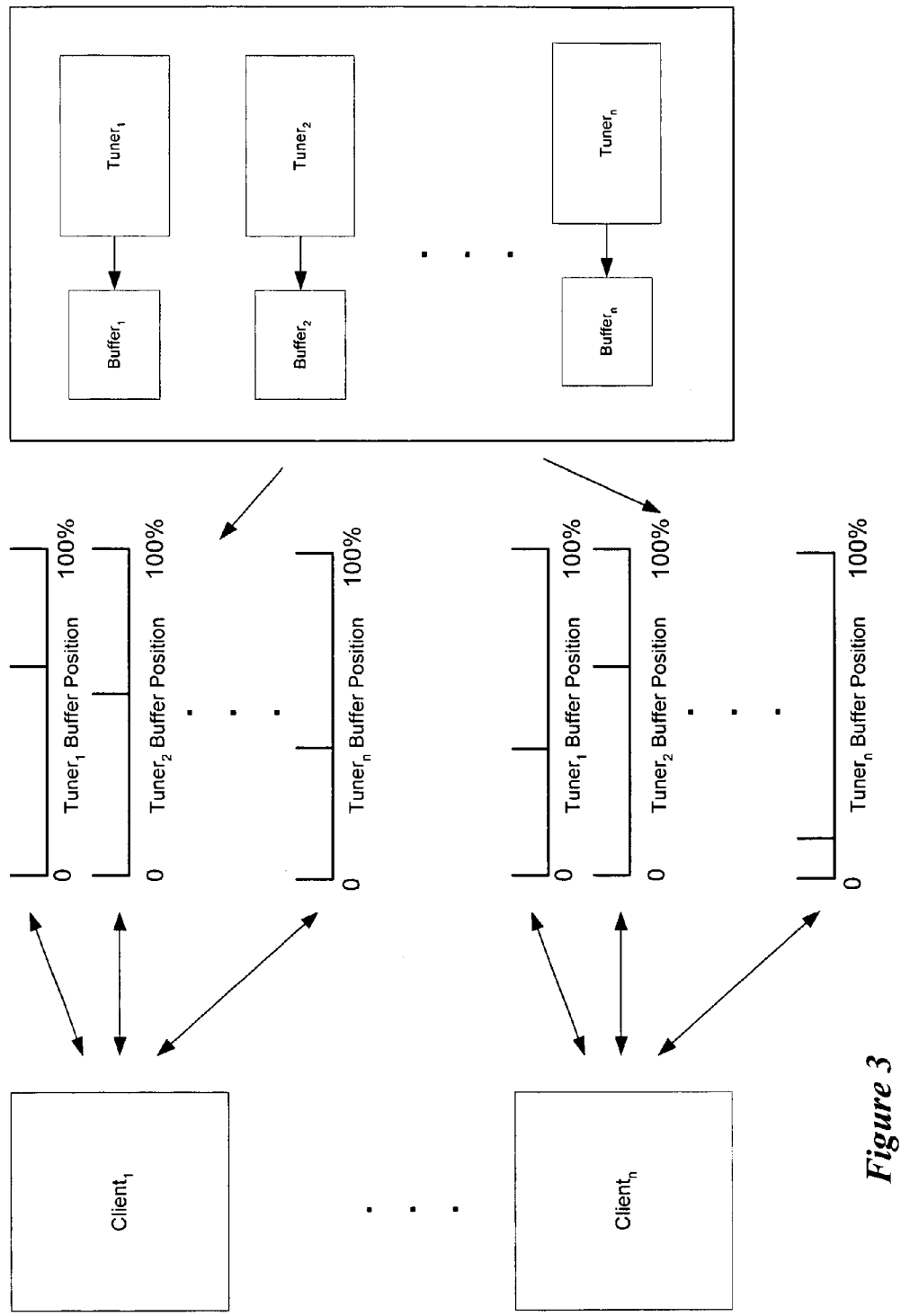
FIG. 3 is a block diagram illustrating one embodiment of television signal buffering for the networked PVR system.

FIG. 3 is a block diagram illustrating one embodiment of television signal buffering for the networked PVR system. Every tuner has a continuous ring buffer. In one embodiment, the size of the ring buffer is flexible, and may be configured. For example, the ring buffer may permit storage of sixty (60) minutes of television. In turn, each client has an independent buffer position for every ring buffer and stored video available in the system. FIG. 3 illustrates an example networked PVR system with "n" tuners. The "n" tuners may be implemented in conjunction with one or more PVR-media servers. As shown in FIG. 3, the output of each tuner is input to a corresponding buffer (e.g., ring buffer). Each client, client$_{1-n}$, has an associated buffer position for each tuner-buffer pair. Specifically, as shown in FIG. 3, client, has buffer positions for tuner$_1$, tuner$_2$, and tuner$_n$. Similarly, client$_n$ also has independent buffer positions for tuners 1-n. In general, a buffer position may comprise a pointer to a position within a video or to a position within a tuner buffer. Each tuner buffer position is depicted in FIG. 3 as a timeline, wherein the beginning and end line segments represent the length of the buffer, and the center line segments represent the clients current buffer position.

Figure 4:
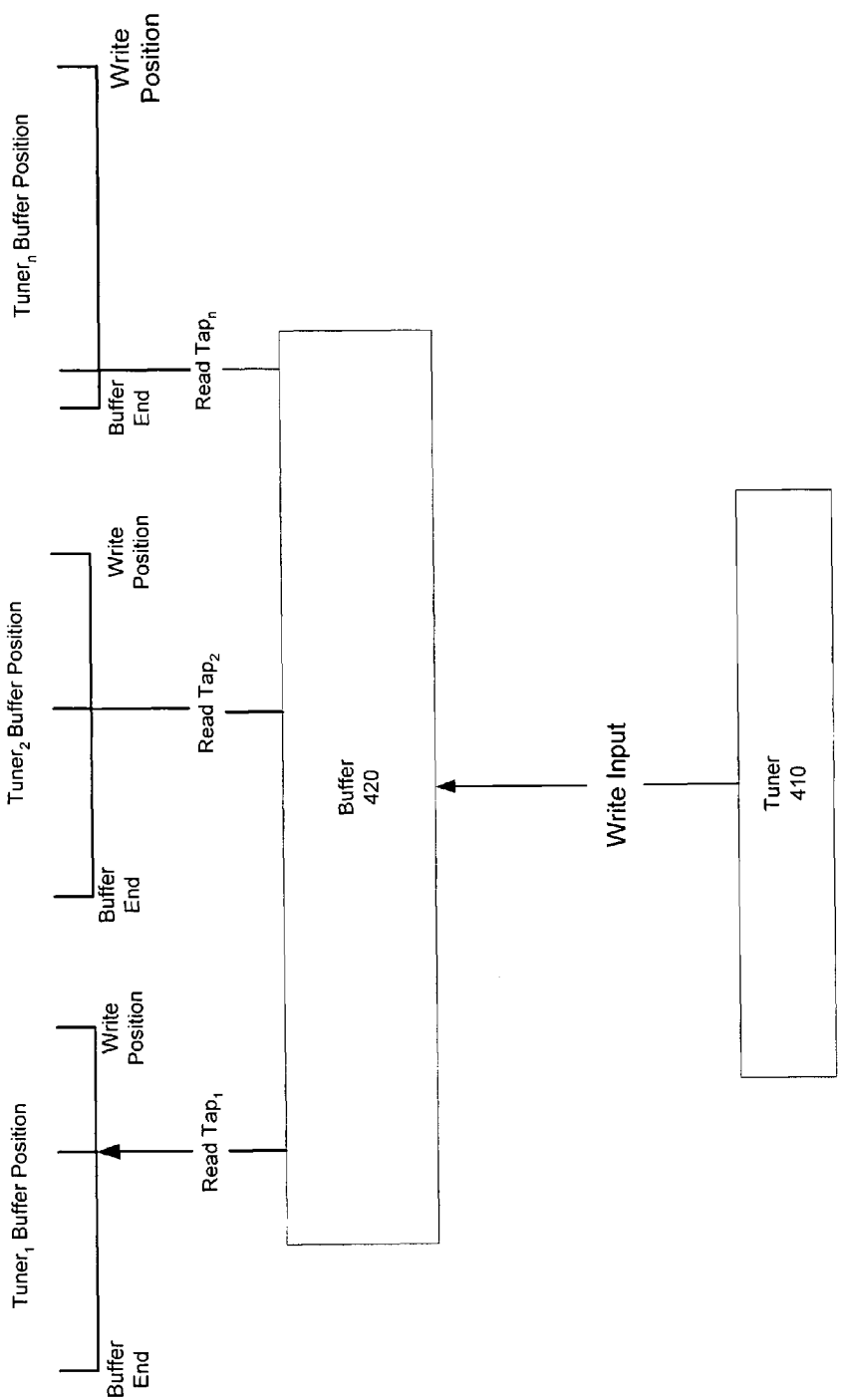
FIG. 4 is a block diagram illustrating on embodiment for a buffer in the networked PVR system.

A buffer in the networked PVR system includes a write tap and a plurality of read taps. FIG. 4 is a block diagram illustrating on embodiment for a buffer in the networked PVR system. A tuner 410 outputs data (e.g., MPEG encoded video) for storage on buffer 420. In one embodiment, the buffer comprises a hard disk drive. The tuner 410 may write to the hard disk drive using a file system. In other embodiments, the tuner 410 may execute direct write operations on the hard disk drive. The buffer has a plurality of read taps. For the example shown in FIG. 4, the buffer has "n" read taps (i.e., "n" represents any integer greater than or equal to one). Each read tap supports an independent buffer position. For example, read tap, supports tuner buffer position$_1$, read tap$_2$ supports tuner buffer position$_2$, and read tap$_n$ supports tuner buffer positions. In one software embodiment, the software conducts multiple read operations on a file to generate the multiple taps.

In one embodiment, the system sets boundary conditions on the relative positions of read and write buffer taps. One boundary condition requires that the read tap not fall behind the write tap an amount greater than the buffer length. For example, a client may view a buffered television program using a first buffer position (i.e., read tap). For this example, a client may pause the viewing of the television program. If this occurs, the first buffer position is constant (i.e., the first buffer position is not advanced). However, the write position is advanced as the television signal is received. Therefore, the distant between the write buffer position and the read buffer position is increased. If the difference between the read buffer position and the write buffer position exceeds the length of the buffer, then an event is generated. A response to the event may be to advance the read buffer position. Also, in another scenario, if a read buffer position advances forward to the corresponding write buffer position, then the read buffer position becomes the location of the write buffer position (i.e., the read buffer position does not advance beyond the write buffer position). For example, a client may fast forward a buffer television program up to the current write position.

Figure 5:
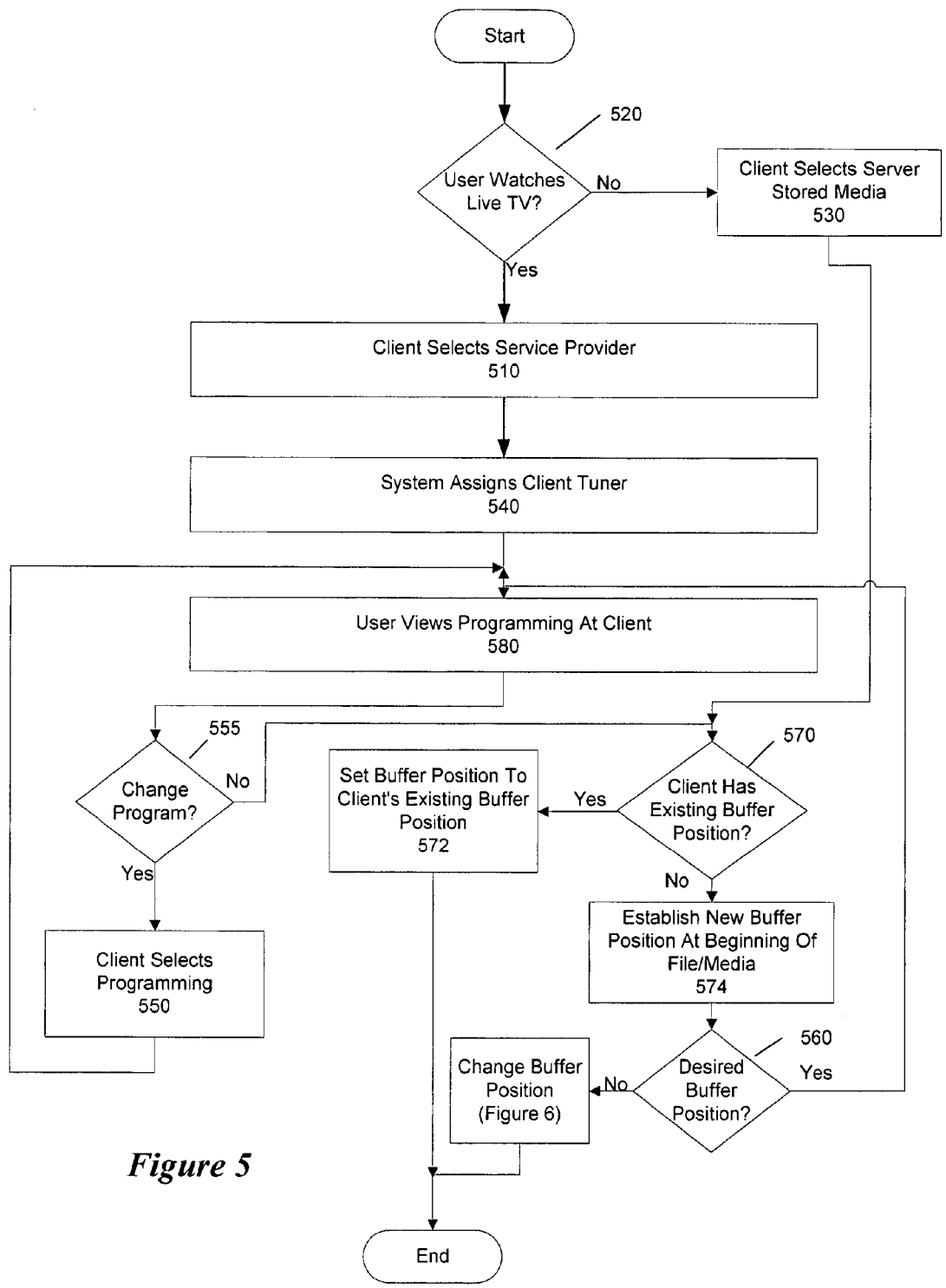
FIG. 5 is a flow diagram illustrating one embodiment for viewing video in the networked PVR system.

FIG. 5 is a flow diagram illustrating one embodiment for viewing video in the networked PVR system. Initially, the user receives a menu option, displayed on a client television, to watch live TV or to select media from a PVR-media server (block 520, FIG. 5). If the client does not elect to watch live television, then the client selects media stored on a PVR-media server (blocks 520 and 530, FIG. 5). Then, as discussed below, the client sets the buffer position through the system. If the user elects to watch live television, then the client selects a television service provider (block 510, FIG. 5). If there is only one television service provider available to the client, then the system eliminates the function of block 510. In one embodiment, the service provider selection may be configured during a set-up mode. For example, the television in the living room may be configured to always receive a television signal from a satellite system. The system selects a tuner for the client (block 540, FIG. 5). In one embodiment, the system automatically allocates, for the client television, an available tuner.

The user views the program at the client (block 580, FIG. 5). If the user desires to change the program, then the client selects programming from the electronic programming guide displayed at the client (blocks 555 and 550, FIG. 5). If the user does not desire to change the program, then the user potentially sets the buffer position. If the user has an existing buffer position and the user desires to set the program to an existing buffer position, then the user selects, through a menu, the existing buffer position (blocks 570 and 572, FIG. 5). If the client does not have an existing buffer position, then the system sets the buffer position to the start of the file/media (blocks 570 and 574, FIG. 5). The user may desire to change the buffer position to an existing buffer position (block 560 FIG. 5). If the user desires to set the program to an existing buffer position, the user, through the system, changes the buffer position. (block 565, See FIG. 6). For example, the user may select a program already in progress. Under this scenario, the user may wish to view the program from the beginning. To accomplish this, the user selects a new buffer position to start at the beginning of the program. The user then views the program at the client (block 580, FIG. 5).

In one embodiment, the PVR-media server acquires programming data, referred to as an electronic programming guide ("EPG"), from an EPG content provider. The EPG dataset provides a list of programs, including channels and times, available from the corresponding television service provider. Typically, the EPG data is provided on a service basis from the EPG content provider. The PVR-media server contacts the EPG content provider to acquire updated programming data. The PVR system utilizes the EPG data to schedule programs as well as to provide programming menus to the clients. Thus, for this embodiment, the PVR system scheduler is specific to an EPG data set. However, a home media networked system may include servers that utilize different EPG content providers, and consequently operate using different EPG data sets. For this embodiment, users only view channel selection menus based on the underlying EPG data sets. Thus, the menu presented at the client is dependent upon the underlying PVR-media server.

In one embodiment, the PVR system permits a client to select television programs without requiring the client to understand the notion of a television tuner. For example, two clients may be receiving a signal from the same tuner. Under this scenario, one of the clients may desire to change the channel to view a different program without affecting the ability of the other client to view the current program. The PVR system provides a menu that permits the user to select additional programming. In one embodiment, the programming menu is based on a specific television service provider and corresponding EPG content provider.

In one embodiment, the user selects programming within a television service provider—EPG content data set. A client may set-up the system to automatically select a preferred television service provider. If a user executes an operation that requires a new tuner, the user selects programming from the previously selected EPG content provider. After the user selects a new program, the system allocates a tuner to the user. Under this scenario, the user does not need to understand the notion of a tuner. Instead, the client only selects a program or cancels an event in order to acquire use of a tuner. If a tuner is not available for allocation to the user, then the system resolves conflict through predetermined "conflict management" procedures. One embodiment for resolving certain conflicts that arise in networked PVR systems is described more fully below.

Figure 6:
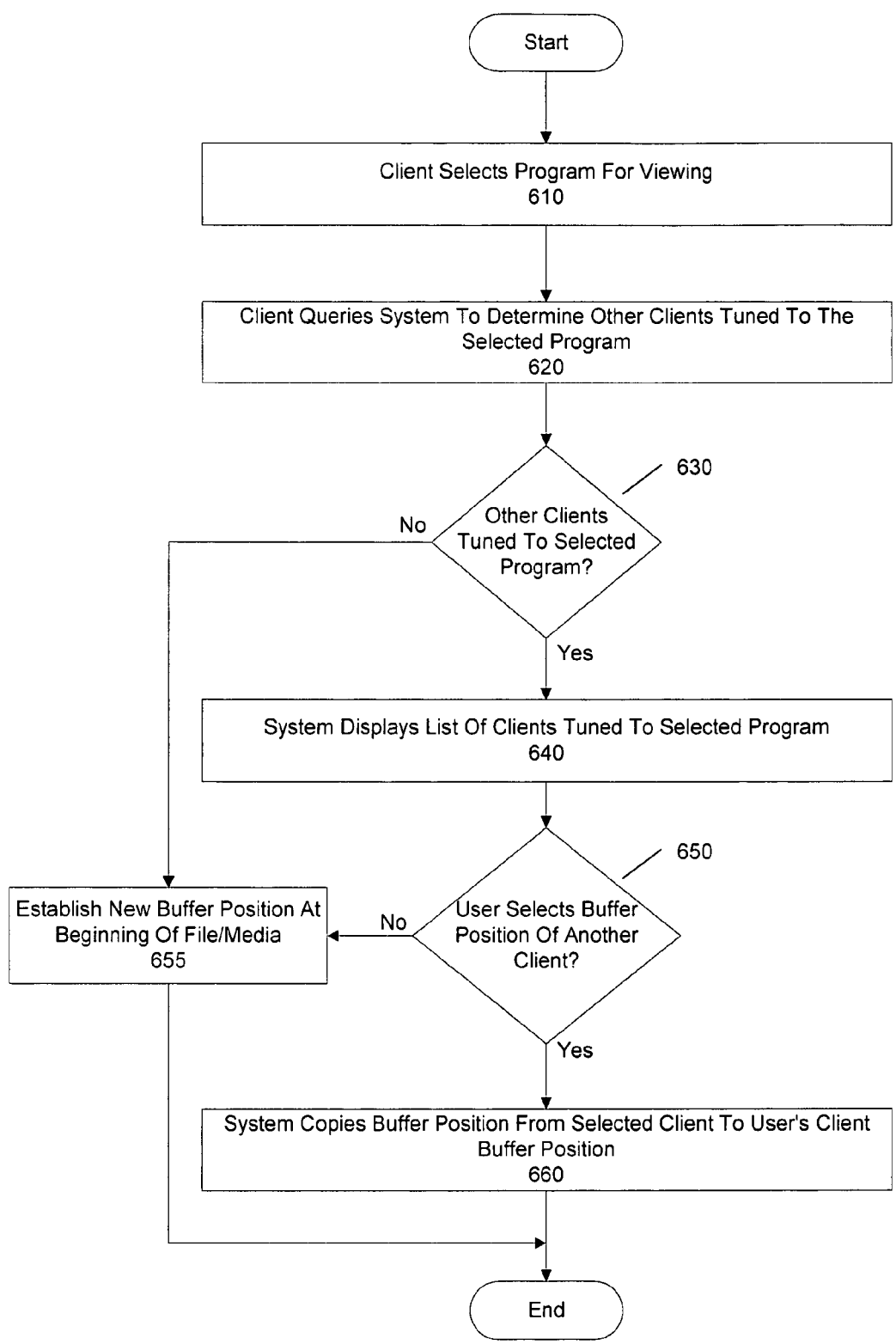
FIG. 6 is a flow diagram illustrating one embodiment for using the networked PVR system of the present invention.

The networked PVR system permits users to select buffer positions from different clients. For example, a user watching a program at a first client (e.g., television in living room) may go to another room and pickup that program from a second client (e.g., television in kitchen) where they left off watching on the first client. Under this scenario, the user may pause the program playing at the living room client for subsequent viewing at the kitchen client. FIG. 6 is a flow diagram illustrating one embodiment for using the networked PVR system of the present invention. For this scenario, the user selects, from a client, a program for viewing (block 610, FIG. 6). The user may then desire to select that program from a different client. To accomplish this, the user queries the PVR system to determine other clients tuned to be selected program (block 620, FIG. 6). If other clients are tuned to the selected program, then the system displays a list of clients tuned to the program (blocks 630 and 640, FIG. 6). For the above scenario, the user may query the PVR system from the client in the kitchen to pickup the program paused in the living room. In one embodiment, the user, from a client, pulls-up a menu item to determine "Who is watching the selected program?" In response, the PVR system displays a menu of client locations currently playing the selected program. For the above example, the PVR system displays the "living room client" to identify that the selected program is currently playing in the living room. Alternatively, if no other clients are tuned to the selected program, then the buffer position is set to the start of the program (blocks 630 and 655, FIG. 6).

If the user desires to select a buffer position of another client, then the PVR system copies a buffer position from the selected client for use as the buffer position for the user's client (blocks 650 and 660, FIG. 6). For the above example, the user, at the kitchen client, selects the buffer position of the living room client, so as to pickup the selected program at the position of the program was paused. Alternatively, the user may desire to view the selected program from the start of the program (blocks 650 and 655, FIG. 6). In one embodiment, the PVR system may synchronize two buffer positions for simultaneous playback at two clients. For example, a user may desire to playback a music video at two different clients so as to play the music over a broader area of the home.

In one embodiment, the PVR system assigns states to television tuners. For this embodiment, a television tuner includes one of the following states: busy, maybe free, and totally free. A busy state indicates that the server is currently recording a program using the tuner. The maybe free state indicates that a client may be viewing a program using the tuner. For example, a user may select to view a program at a client. Thereafter, the PVR system does not actually know whether the user is still viewing the program (e.g., as the user may have just turned off their monitor). Under this scenario, the tuner is designated as "maybe free." If the tuner is designated as "totally free", then the tuner was not allocated by the scheduler and a client was not viewing programming with the tuner. As described fully below, the tuners states are used to allocate tuners.

In one embodiment, the PVR system utilizes a scheduler. In general, the scheduler acts as a "to do list" for the system. For example, the scheduler executes a process to record programs selected by system users. The programs may be selected for recording on an individual basis, or the programs may be scheduled for recording based on a subscription. The scheduler resolves issues of conflict management in order to allocate resources to record programs.

In one embodiment, the PVR system supports "subscriptions." In general, with a subscription, the system records recurring broadcasts of a selected program. Using a subscription, a user need only select the program for subscription to record all occurrences of that program. In one embodiment, the scheduler of a PVR-media server identifies events to fulfill subscriptions. For example, a user may select a subscription to a television show, "Reality Television." The scheduler of a PVR-media server determines, from the EPG data set, all unique episodes of the television show, "Reality Television." The scheduler generates events, one event for each unique episode identified, to record the event. In one embodiment, a subscription is scheduled within a single PVR-media server. However, in other embodiments, subscriptions may be pushed to other PVR-media servers. For example, the scheduler of a first PVR-media server may include events pertaining to a subscription. If the first PVR-media server has conflicts with one or more events of the subscription, then an event of the entire subscription may be assigned to a second PVR-media server. If this occurs, the scheduler of the second PVR-media server fulfills the subscription (e.g., in the same manner as the scheduler for the first PVR-media server). For example, events from the scheduler of the first PVR-media server may be transferred to the scheduler of the second PVR-media server. In addition, the scheduler of the second PVR-media server may assume the task of scheduling future events for the subscription. Also, subscriptions may be pushed between PVR-media servers if a PVR-media server is removed from the network.

Figure 7:
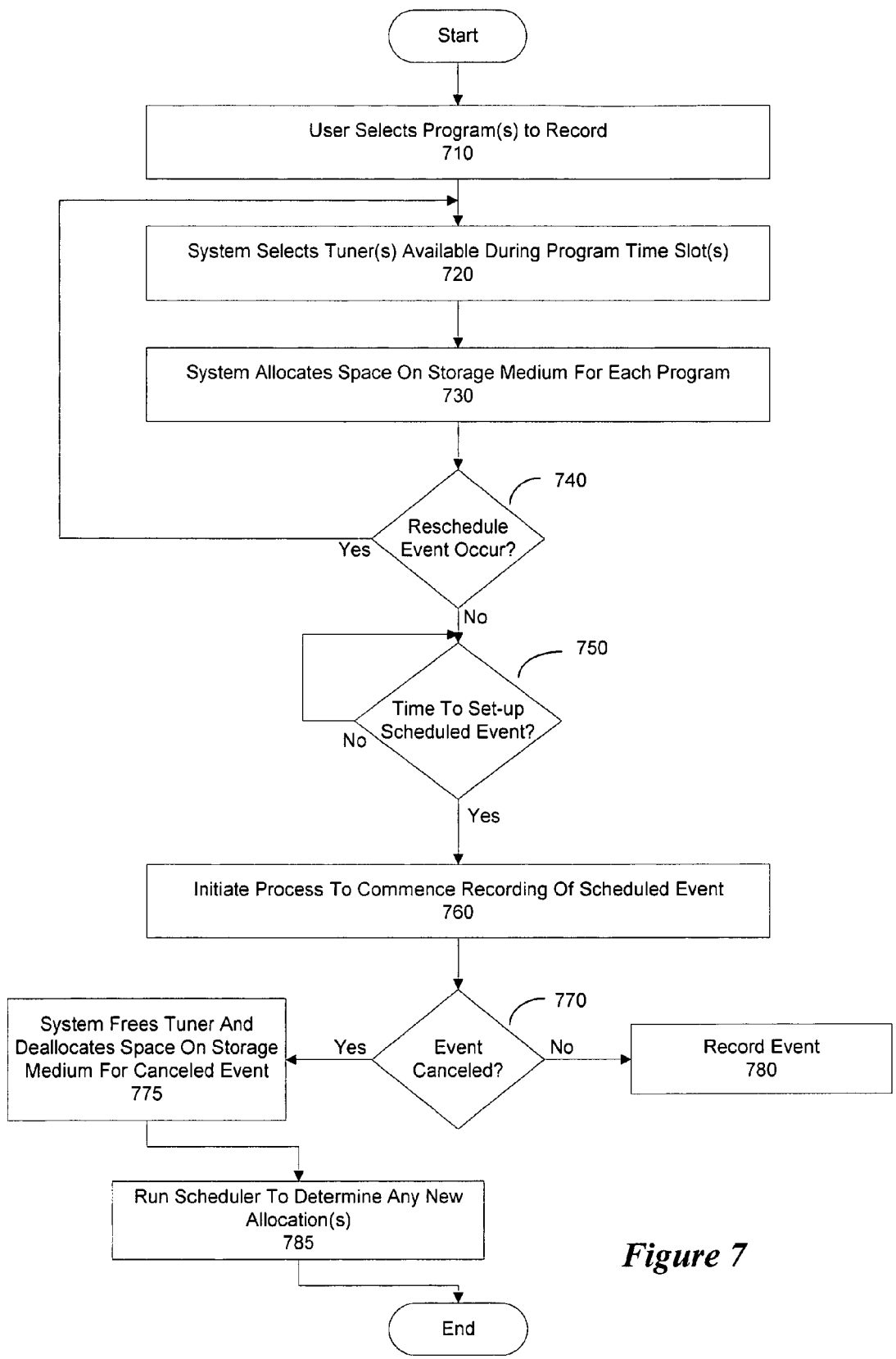
FIG. 7 is a flow diagram illustrating one embodiment for scheduling events in the networked PVR system of the present invention.

FIG. 7 is a flow diagram illustrating one embodiment for scheduling events in the networked PVR system of the present invention. First, a user selects, through a menu, programs to record, either individually or through a subscription (block 710, FIG. 7). In response, the system selects a tuner available during the time slot of the event (block 720, FIG. 7).

In addition, the system allocates storage space on the storage medium for the scheduled program (block 730, FIG. 7). If a "re-schedule" of event occurs in the system, the process is repeated to both allocate available tuners and available storage space (blocks 740, 720 and 730, FIG. 7). In one embodiment, a "re-schedule" event occurs when the electronic programming guide data is downloaded to a PVR-media server. A re-schedule event also occurs when a user deletes an item from the scheduler. For example, a user may delete an event to record a program that previously canceled another program from a prior subscription. Under this scenario, the system reschedules the prior subscription because the user canceled the conflicting program.

When the time to set-up the scheduled event has arrived (e.g., a time prior to the time of the scheduled event), the system initiates the process to commence recording of the scheduled event (blocks 750 and 760, FIG. 7). One embodiment for recording a scheduled event, including resolving conflicts of tuner resources, is described fully below in conjunction with a description of FIG. 8. If the event is canceled, then the system frees a tuner and de-allocates space on the storage medium for the cancelled event (blocks 770 and 775, FIG. 7). Also, the scheduler is run to determine any new allocations to fill the slot (block 785, FIG. 7). In one embodiment, the system also permits the user to re-schedule, instead of cancel, the event. Alternatively, if the event is not canceled, then the scheduled event is recorded (blocks 770 and 780, FIG. 7).

In one embodiment, the PVR system assigns equal ownership to all clients using a tuner. For example, three clients may be utilizing the same tuner (i.e., all three clients are viewing the same program although potentially at different portions of the program). If one client changes the channel of the tuner, then the tuner is set to the new the channel, and consequently all three clients are tuned to the new program.

The PVR system resolves several conflicts that may occur in a networked PVR system (i.e., referred to as "conflict management"). Some conflicts that arise in a networked PVR system include: inadequate storage space to record new programs; an insufficient number of tuners to record scheduled programming; inconsistent input, including requests to change the channel when recording a scheduled event; and an insufficient number of tuners to record events.

In one embodiment, if a PVR-media server has insufficient storage space to record a scheduled event, then the system automatically deletes content prior to recording. One embodiment to assign priority for content deletion is described more fully below.

Figure 8:
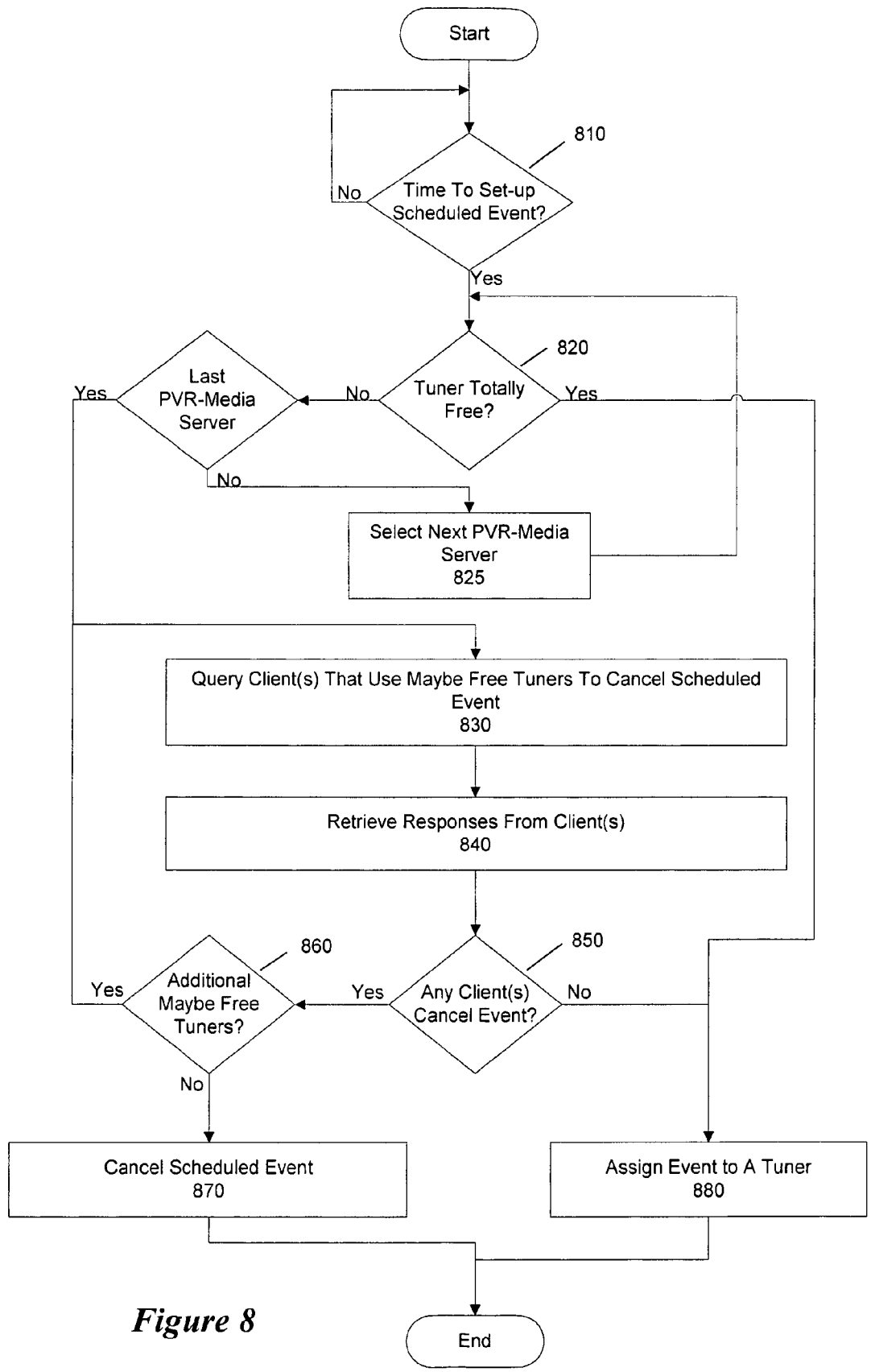
FIG. 8 is a flow diagram illustrating one embodiment for recording programs.

FIG. 8 is a flow diagram illustrating one embodiment for recording programs. Just prior to the time of a scheduled event, the PVR system determines whether a tuner is available (blocks 810 and 820, FIG. 8). If a tuner is available (i.e., the tuner is designated as "totally free"), then the tuner is assigned to record the program (blocks 820 and 880, FIG. 8). If no tuners are designated "totally free" on the PVR-media server, then the system determines whether there are any other PVR-media servers with tuners (block 822, FIG. 8). If so, another PVR-media server is selected, and the system determines whether the selected PVR-media server has an available tuner (blocks 825 and 820, FIG. 8). This process is repeated for all PVR-media servers on the network.

If a tuner is not available (i.e., all tuners on the network are designated as either "busy" or "maybe free"), then the system queries the clients allocated or potentially allocated to the tuners to determine whether the clients desire to cancel the scheduled event (block 830, FIG. 8). For example, in one embodiment, to query the clients, the PVR system displays a menu screen on each client asking whether the system should proceed with the scheduled event. All clients allocated to the tuner receive the inquiry. For example, the screen display may ask "System needs to change the channel to record program X at time Y, is this OK?" If all of the client responses are yes to the inquiry, then the system proceeds to record the scheduled event. If a client does not answer the inquiry in a predetermined amount of time, then the system also proceeds to record the scheduled event.

The PVR system retrieves the responses from the clients (block 840, FIG. 8). If any one of the clients cancels the event, then the system determines whether there are additional PVR-media servers with tuners to allocate to record the scheduled event (blocks 850 and 860, FIG. 8). If there are no more additional PVR-media servers, then the scheduled event is canceled (blocks 860 and 870, FIG. 8). Alternatively, if there are additional PVR-media servers in the system, then the process is repeated to allocate available tuners (blocks 860, 820, 830, 840, and 850, FIG. 8). This process to assign tuners is repeated for all PVR-media servers in the system.

The process of FIG. 8 may be used to allocate tuners for multiple events scheduled at the same time. For example, three programs may be scheduled for recording at an instance in time. The process is repeated for each of the programs. For example, if a client cancels the first scheduled program, then that program is pushed to, if available, another PVR-media server in the system. Then, all the relevant clients receive another inquiry with regard to the scheduling of the second program. Again, if anyone of the clients cancel the second program, the scheduling of the second program is potentially shifted to another PVR-media server.

In one embodiment, the PVR networked system has the ability for the user to "lock a tuner." For example, if a user is watching a TV show that spans several hours (e.g. baseball game, academy awards, etc.), then the user may not want to receive multiple requests to change the channel to a previously scheduled event. In one embodiment, the user may select an option in the system to bypass the inquiry to change the channel. When enabled, the system does not display the inquiry to re-allocate the tuner to resolve tuner resource conflicts during the user's program.

In one embodiment, the networked PVR system includes advanced conflict management. In general, advanced conflict management aids the user to resolve conflicts using means other then querying the user to cancel scheduled events. For example, an advanced conflict manager may automatically seek out alternate presentations of identical television episodes, and present to the user an option for the system to record the program when a conflict does not arise. Thus, if a user attempts to record two shows simultaneously, the system may return a message stating that "The episode of "Your Favorite Show", set to record at 9 pm on channel 4, is now set to record at 11 pm on channel 7."

A user may attempt to change a channel on a tuner currently recording a scheduled event. Under this scenario, the system prompts the user to cancel the scheduled event. Also, a user may attempt to record a program when there are no more available tuners in the system. Under this scenario, the user receives a list, from the entire network, of events to cancel. For example, a system may have three tuners. A first tuner may be recording a first scheduled event, a second tuner may be recording a second scheduled event, and a third tuner may be allocated for use by at least one client. If the user attempts to record another program, the system displays the three programs currently allocated to the three tuners. In response, if the user still wants to record the new program, the user cancels one of the events displayed.

In one embodiment, the PVR system includes a "deletion manager." In general, a deletion manager determines the priority to delete content stored in the PVR-media servers. In one embodiment, the deletion manager utilizes a date based deletion system. Under a date based deletion system, the first recorded program is also the first program scheduled for deletion. After a predetermined amount of time, an item is tagged on a menu to inform the user that the program may be deleted. Additional icons may be used to inform the user concerning potential deletion of programs. For example, another icon may be used to inform the user that the item may be deleted, and a different icon may be used to inform the user that the program will not be deleted.

In one embodiment, the deletion manager uses a priority system based on "sooner" or "later" flags. Under this system, the user marks content for deletion "sooner" or "later." The deletion manager analyzes content to delete items marked "sooner" before items marked "later." This system may be used in conjunction with the date based deletion system described above. In another embodiment, the user ranks content for a priority of deletion in accordance with a range (e.g., 1-5).

Client Device Aggregation:

The networked PVR system utilizes a "peer-to-peer" architecture. All client devices on the media platform have the ability to communicate with other devices, including multiple client devices and multiple PVR-media servers. This architecture permits a device to obtain all media, including television signals, available on the network and to aggregate the media for presentation on that device.

A device, including a client device or a server device, may enter and/or exit the home network, at any time, and still maintain full functionality. Thus, when a device is powered off, other devices automatically recognize that the device is no longer available on the home network. When a new device is added or a portable device comes onto the network, the other nodes automatically recognize the new devices. The other nodes may utilize the services on the added device. A new PVR-media server may also automatically recognize new devices, as long as at least one other PVR-media server is currently on the network.

Figure 9:
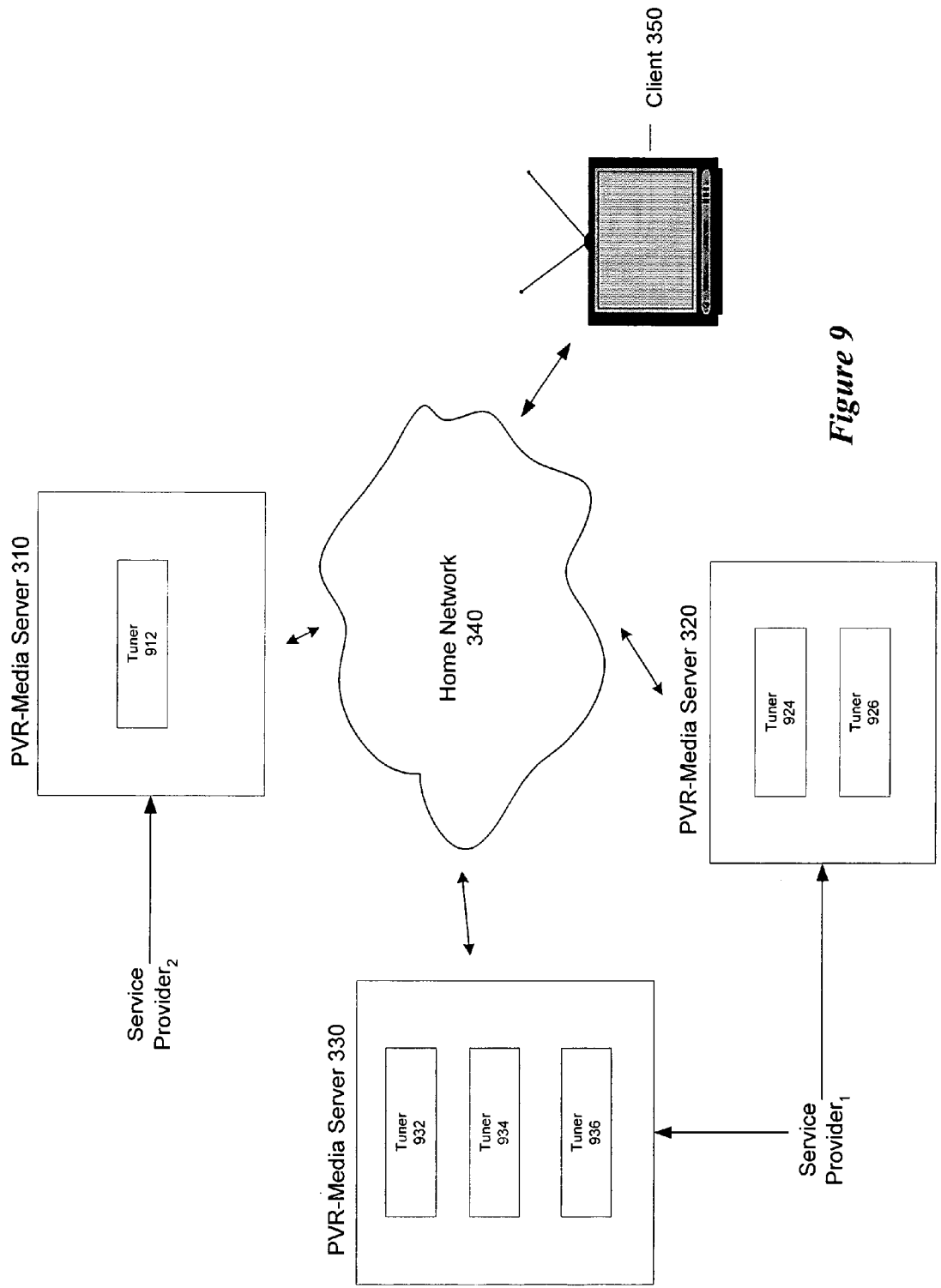
FIG. 9 illustrates client device aggregation of media in accordance with one embodiment of the present invention.

FIG. 9 illustrates client device aggregation of television signals in accordance with one embodiment of the present invention. For this example, three PVR-media servers (910, 920, and 930) are coupled to home network 940. As shown in FIG. 9, each PVR-media server has at least one tuner. For example, PVR-media server 930 has three tuners (932, 934 and 936). In addition, the PVR-media servers may store various media items (e.g., video, audio, photos, etc). Also, for this example, client device 950 resides on the home media network 940. Client device 950 may comprise a television.

After completing a discovery process, client device 950 determines programming available on home network 940. Thus, client device 950 aggregates programming from all tuners for use at client device 950. As shown in FIG. 9, client device 950 aggregates all programming available through PVR-media servers 910, 920 and 930.

The networked PVR system provides the capability to identify all programming as unique. For example, all programming classified under the genre "comedy" is recognized as such, and the system displays them accordingly. Two or more actors may have the same name. The networked PVR system utilizes a distributed database that allows the system to distinguish among unique programs. Thus, if a program is offered over two different television service providers, then during client device aggregation, the client device recognizes only a single program. For the example of FIG. 9, the movie, "Greatest American Movie", is offered through both PVR-media server 920 and PVR-media server 910. During client programming aggregation, client device 950 recognizes the movie, "Greatest American Movie", offered through both PVR-media servers 910 and 920, as the same program. Thus, client device 350 only recognizes the movie, "Greatest American Movie", as a single program.

The underlying protocols alone do not permit a client device to aggregate programming from devices on the home network. The protocols themselves have no requirement to support a distributed system. For this embodiment of the networked PVR system, aggregation logic creates a distributed system using non-distributed protocols. The aggregation logic uses multiple protocols to integrate devices on the home network.

Figure 10:
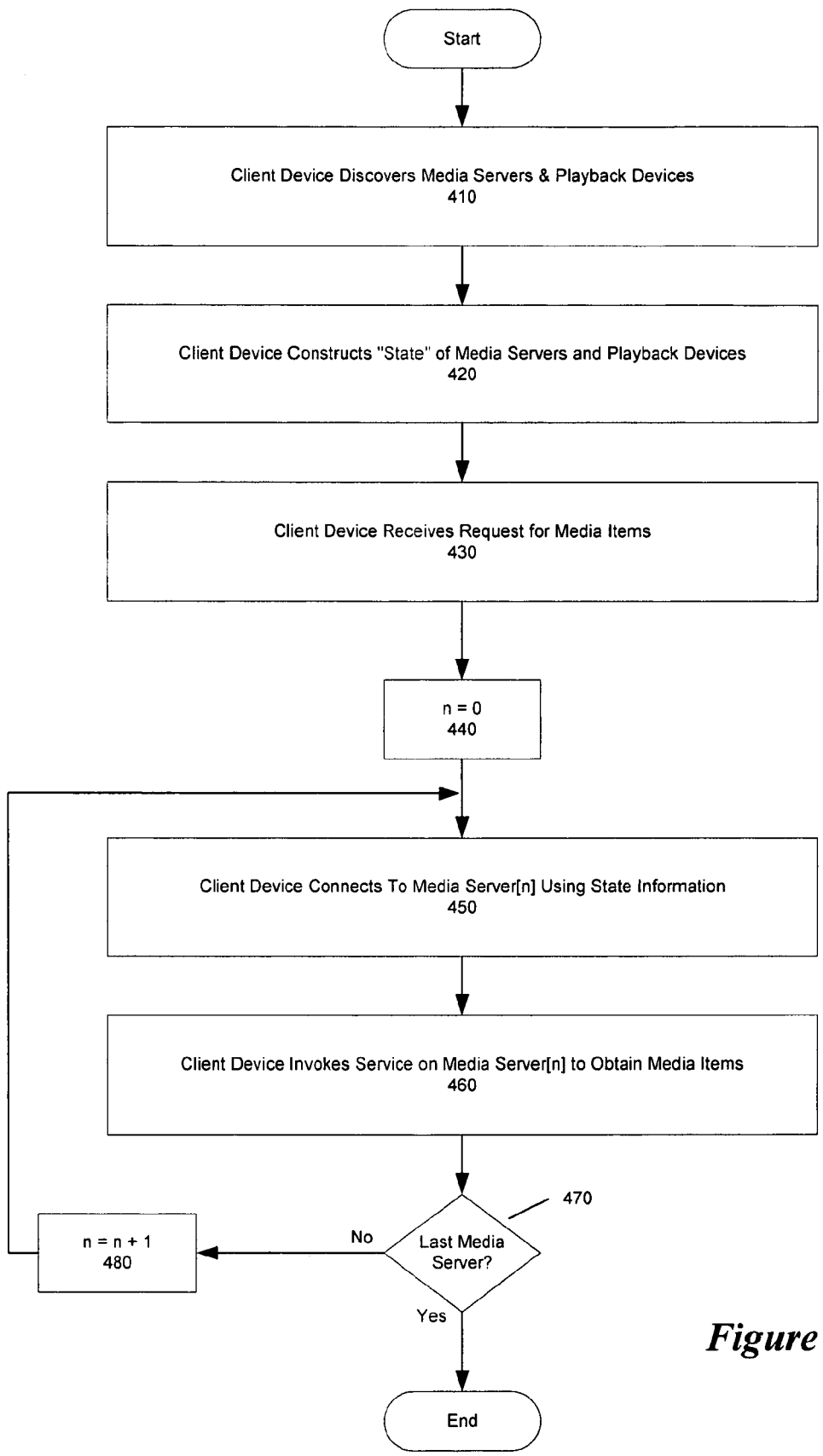
FIG. 10 is a flow diagram illustrating one embodiment for client media aggregation over a network.

FIG. 10 is a flow diagram illustrating one embodiment for client aggregation of programs over a network. Initially, a client device discovers devices (e.g., PVR-media servers) on the home network (block 1010, FIG. 10). One embodiment for discovering devices on the home network is described more fully below. Based on information learned in the discovery process, the client device constructs state information for the discovered devices (block 420, FIG. 10). The client device receives a request for media items (block 430, FIG. 10). The aggregation logic receives requests from software components operating above the aggregation logic. For example, the client device may comprise a television operating a user interface. A user may request, using a remote control device, a list of all television programs, either live or pre-recorded, available on the home network. For this example, application logic on the user interface translates the request for programs, and forwards the request to the aggregation logic.

The aggregation logic for the client device acquires programming information from all PVR-media servers that provide the selected programs. For example, if the client requests television programs from a specific genre (e.g., comedy), then the client device acquires all programs classified in that genre available from all PVR-media servers. This operation is illustrated in FIG. 10 (blocks 1040, 1050, 1060, 1070 and 1080). Specifically, an identifier (i.e., n=0) to select a specific PVR-media server is set (block 440, FIG. 10). The client device connects to a selected PVR-media server (e.g., PVR-media server[0]) using state information acquired during the discovery process (block 1050, FIG. 10). Specifically, the client device translates the request for programming to a protocol supported by the selected PVR-media server, and forwards the request to the PVR-media server. In one embodiment, the client device invokes a service on the selected PVR-media server to obtain the programming (block 1060, FIG. 10). In one embodiment, the client device invokes a content manager service on the PVR-media server to acquire a list of programs available. If there are more PVR-media servers available on the home network, the client device identifies a new PVR-media server to acquire programming (blocks 1070 and 1080, FIG. 10). When the client device has acquired a list of programming from all the available PVR-media servers, the process is complete.

Figure 11:
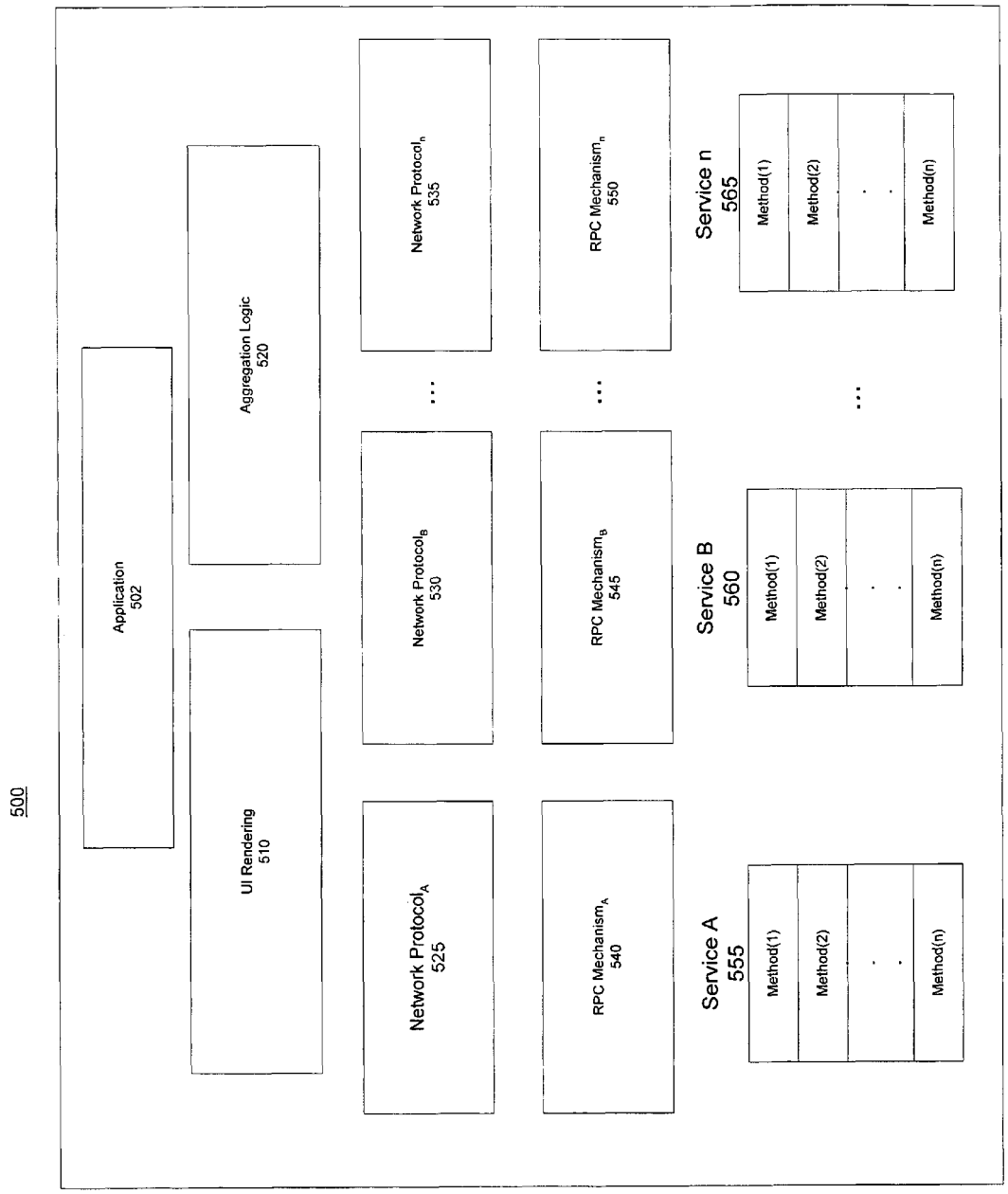
FIG. 11 is a block diagram illustrating one embodiment for software components operating on a networked PVR system device.

FIG. 11 is a block diagram illustrating one embodiment for software components operating on a networked PVR system device. Software components 500 include, at the highest level, application software 502. The application software 502 implements functionality for an underlying device. For example, application software 502 may implement functions for a DVD player. As shown in FIG. 11, underneath the application software 502 is aggregation logic 520. As discussed above, aggregation logic 520 permits a client device to aggregate media items and television programming on the home network.

The software components 500 also include user interface ("UI") rendering logic 510. UI rendering component 510 translates scene information to display information suitable for display on the client device. The UI rendering component 510 also renders the display data. For example, if the underlying client device includes a television display (e.g., CRT), then UI rendering engine 510 generates graphics data from scene information, and renders the graphics data on the television display.

As shown in FIG. 11, the client device incorporates one or more network protocols and remote procedure calls ("RPC") mechanisms. For example, FIG. 11 shows that the client device supports network protocol$_A$ (1125), network protocol$_B$ (1130), and network protocol$_n$ (1135). For this example, client device software 500 supports RPC mechanism$_A$ (1140), RPC mechanism$_B$ (1145), and RPC mechanism$_n$ (1150).

The client device software 500 supports one or more services. As shown in FIG. 11, one or more methods of a service are accessible through an interface. In general, the methods, when invoked, provide specific functionality for the underlying service. For this example, client device software 500 includes service$_A$ (555), service$_B$ (560), and service, (565). Each service is associated with one or more methods (i.e., method(1)-method(n)).

In one embodiment, the networked PVR system supports a plurality of underlying protocols. In general, the protocols define commands, RPC mechanisms, and interfaces to services. In one embodiment, the networked PVR system supports an industry defined UPnP protocol. In general, the UPnP protocol defines discovery over IP networks, an RPC mechanism, and interfaces for activating services. UPNP services include: a content directory service, a connection manager service, an audio/video ("A/V") transport service and an A/V control service.

In one embodiment, the networked PVR system also supports a proprietary protocol (i.e., non-industry standard protocol). For this embodiment, the proprietary protocol defines a network discovery process, an RPC mechanism, and an interface to services. The services include a content manager, a media player service, and a PVR control interface. The content manager service allows a client device to interface to a database. Specifically, using the content manager service, the client device may extract information (e.g., URL to identify media, metadata, etc.) from a database on another network device. Thus, the content manager service provides a means for a device of the networked PVR system to query a database. The media player service defines an interface to permit playback functionality (e.g., initiate and control media streams). The PVR control interface enables streaming media on a non-stored object. In addition, the PVR control interface permits a user to record current programming as well as schedule recording of future programming.

In one embodiment, the discovery process on the proprietary protocol implements asynchronous based messaging. The discovery protocol operates on any network that supports packet based messaging or on a serialized network. In one embodiment, the discovery protocol includes an "announce" command, a "discovery" command, and a "bye-bye" command. The announce command is used by a device to announce its presence on the home media network. A discovery command is a request for an announcement (i.e., queries whether any client devices are on the home network). The "bye-bye" command is used by a client device to announce that the client device is leaving the network. In one embodiment, there are two types of announcements and two types of "bye-bye" commands: one for devices and one for services.

In one embodiment, the RPC mechanism, supported by the proprietary protocol, uses a packet-based protocol. The services include methods and an identification number to permit a device on the home network to construct RPC based packets with the appropriate arguments. In general, an RPC mechanism permits a device to control another device on the network. The protocol is effectuated through requests and responses. The RPC packets include a header. In one embodiment, the header contains: version information, a command class (maps to a particular service), the command (the method the device is requesting or the response coming from the method), an identification (identification of requests or identification of responses corresponding to a request), and a length. After the header, the RPC protocol format specifies data (i.e., arguments for requests and returns values for responses).

Figure 12:
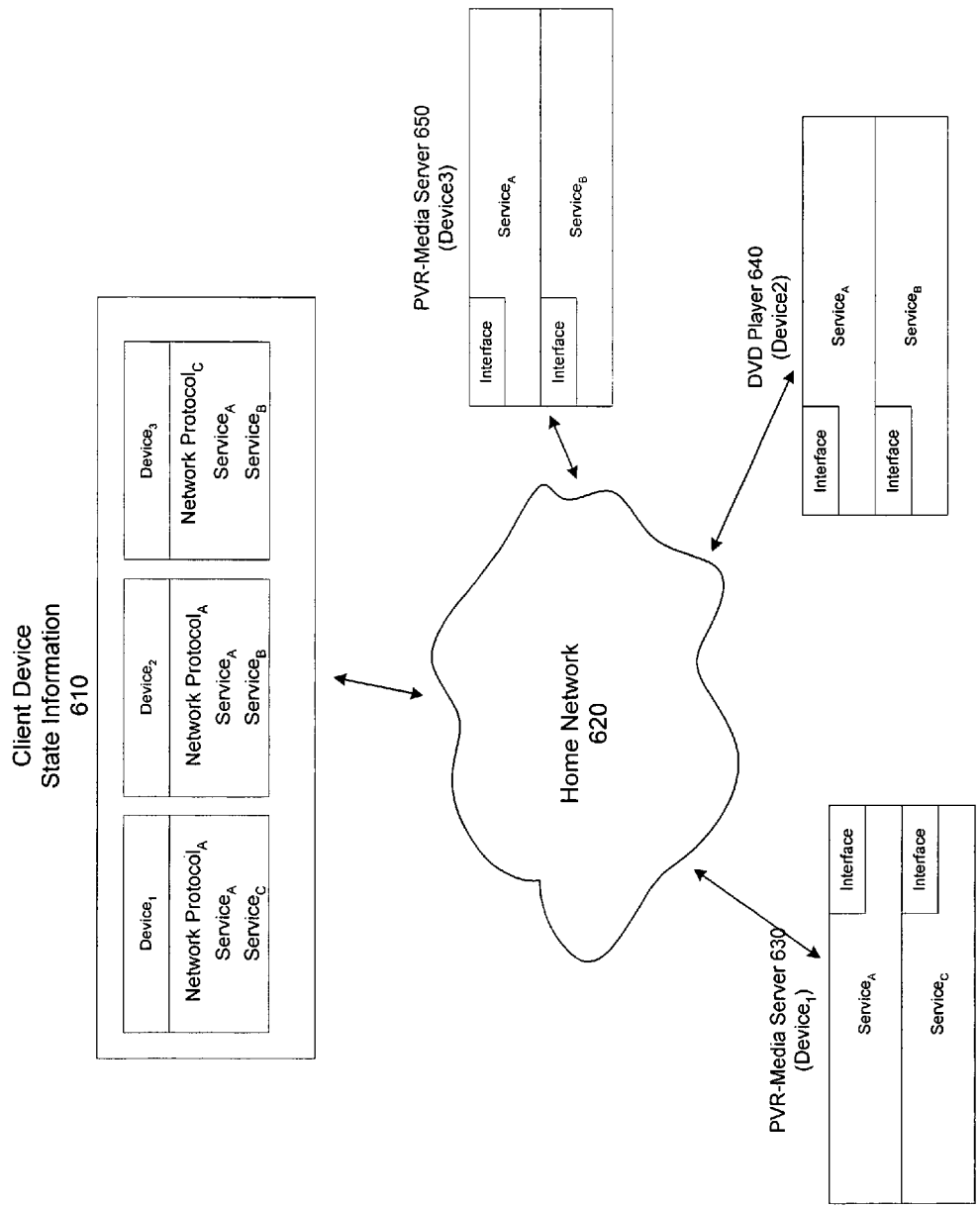
FIG. 12 is a block diagram illustrating an example home network for the networked PVR system.

FIG. 12 is a block diagram illustrating an example home network for the networked PVR system. For this example, a home network includes PVR-media server 1250, DVD player 1240, and PVR-media server 1230. A client device (1210), which includes a television, enters the home network 620, and discovers, using a supporting protocol, three devices (e.g., PVR-media server 1250, DVD player 1240, and PVR-media server 1230). As shown in FIG. 12, client device 1210 stores state information for each of the devices discovered on home network 1220. Specifically, client device 1210 stores, for device, (PVR-media server 1230) a supporting network protocol (i.e., network protocol$_A$) as well as a list of services supported by the devices (i.e., service$_A$ and service$_C$). The network protocol also specifies an RPC mechanism to execute remote procedure calls on PVR-media server 1230. Similarly, state information for device$_2$ (i.e., DVD player 1240) indicates that device$_2$ supports network protocol$_A$ and implements service$_A$ and service$_B$. Device$_3$, PVR-media server 1250, supports network protocol$_C$, and implements service$_A$ and service$_B$.

As shown in FIG. 12, each service (e.g., service$_A$, service$_B$, and service$_C$) supports an interface. The interface defines a specification to provide a means to access the methods or commands within a service. As such, the client device 1210 utilizes services (service$_A$ or service$_B$) on PVR-media server 1250 through their respective interfaces. Note that PVR-media server 1230, DVD player 1240 and PVR-server 1250 all implement service$_A$. Each interface for service$_A$ is the same to permit uniform accessibility to the service. However, the implementation of service$_A$ in each of the devices may be different.

In one embodiment, a networked PVR system implementation provides security. For this embodiment, the announcement command is open ended, such that the protocol only defines a minimum specification for communication. Thus, announcement protocols may support multiple network specifications, including TCP and secure sockets layer ("SSL"). The protocol supports implementation on TCP/IP networks. In addition, the protocol supports SSL operating on TCP/IP networks. SSL permits secure communications, including authentication, between two parties on a network.

The proprietary protocol also permits an implementation using partial security. For this embodiment, a service may include some methods that require secure communications and other methods that do not require secure communications. Thus, some methods utilize SSL technology to realize secure communications between two devices on the home network.

Figure 13:
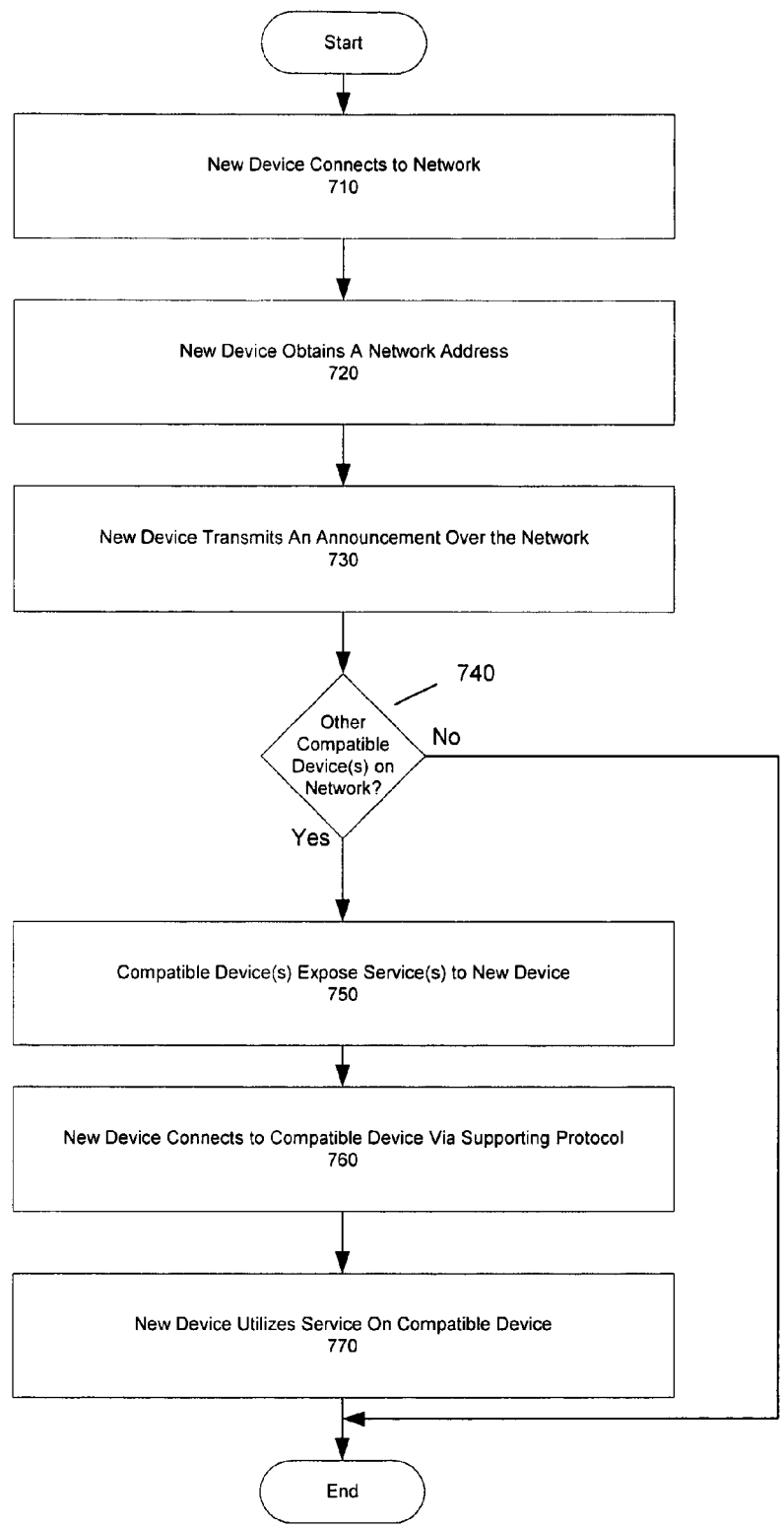
FIG. 13 is a flow diagram illustrating one embodiment for discovering devices in the networked PVR system.

Discovery:

FIG. 13 is a flow diagram illustrating one embodiment for discovering devices in the networked PVR system. A new device (i.e., a device not currently connected to the network) is connected to the home media network (block 1310, FIG. 13). In order to communicate on the network, the new device obtains a network address (block 1320, FIG. 13). For example, in an IP network, the client requires an IP address. If the underlying network supports TCP/IP, then the client device determines if there is a DHCP server. If so, the DHCP server assigns the IP address to the new device. If not (i.e., the DHCP server is not available to assign the new device an IP address), then the new device selects an IP address from a pool and determines whether any other device on the home network has that IP address. If no other device on the network has that IP address, then the client device uses this IP address. This process of auto IP addressing allows communication on a home network within a single subnet.

The new device transmits an "announcement" command over the network (block 1330, FIG. 13). The format of the announcement command complies with a protocol supported by the devices. The new device may broadcast or multicast the announcement command over the network. For example, in an IP network, the new device may multicast the announcement in order to expand subnets if the home network includes a gateway. A multicast format is used to specify specific IP addresses (e.g., transmitting an announcement only to those devices on the network interested or compatible with the new device). As used herein, compatible devices are those devices that may be interested in communicating with the client device.

In response to the new device's announcement command, the new device constructs state information. In general, the state information provides details regarding devices available on the network. The state information includes protocols and services supported by those devices. When compatible devices on the network receive the announcement command, those compatible devices may add information, encapsulated in the announcement command, to a local cache.

If there are no compatible devices on the network or the new device does not desire to utilize a service on the network, then the process terminates. For example, if the new device is a television, then compatible devices include those PVR-media servers storing video (e.g., DVD, MPEG, etc.) as well as providing live or pre-recorded television. If there are other compatible devices on the network, those devices expose one or more services to the new device (block 1350, FIG. 13). To discovery services on the network, the new device transmits a discovery command and waits for a response. For this example, a PVR-media server, which provides live television, exposes an interface to allow the new device to aggregate programming provided by the PVR-media server (e.g., programming provided by a television service provider).

In response to the request (e.g., new device application logic), the new device connects to a compatible device via a supporting protocol (block 760, FIG. 13). Specifically, the device translates the protocol for the appropriate device using the state information. For example, if the compatible device supports an industry standard protocol, then the new device selects the industry standard protocol to communicate to that device. The new device utilizes the services on the compatible device (block 1370, FIG. 13).

A PVR-media server entering a home network is one example of the discovery process. For this example, the PVR-media server, after obtaining a network address, transmits an announcement command over the network. The PVR-media server announces the services it supports (e.g., content manager, media player service and PVR control interface), and exposes interfaces to network clients to permit access to those services. If a device enters the network, the device waits for an announcement from the server. When the client identifies the PVR-media server, the client connects to the PVR-media server via a protocol the server specified in the announcement command. This process allows the client device to navigate media and programming on the PVR-media server. Using the supporting protocol, the client device connects to a playback device (e.g., television), either itself or another playback device, and instructs the playback device to play the program that a user selected from programming available on the PVR-media server.

Networked PVR Data Model:

The networked PVR system operates in conjunction with a data model. The format and arrangement of underlying database is not defined by the networked PVR system. In the data model, objects (e.g., media items) have unique identifications in the database. The objects also have an associated "type" (e.g., channels, time slots, episodes, and shows). The data model defines relationships to define structure and hierarchy among objects and types.

Figure 14:
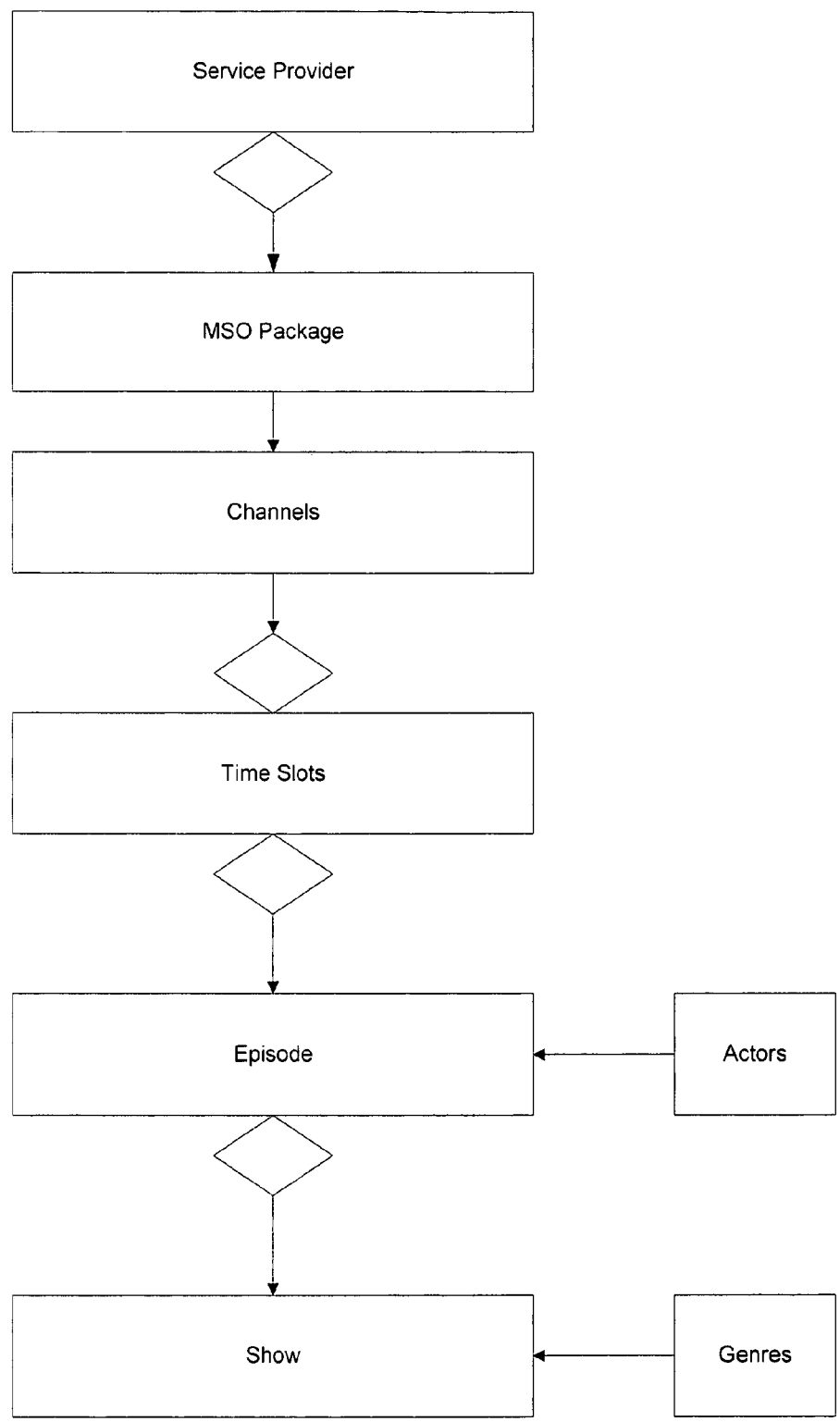
FIG. 14 is a block diagram illustrating one embodiment for a data model for elements of a networked PVR system.

FIG. 14 is a block diagram illustrating one embodiment for a data model for elements of a networked PVR system. For this embodiment, many service providers are mapped to a single MSO package. In general, the MSO package defines data (e.g., time, channel, content, etc.) for television programming. Data is extracted to map the MSO package to channels. The channels data object defines all channels available. As shown in FIG. 14, each channel maps to multiple time slots. An episode data object is mapped to one or more time slots. The episode data object identifies each individual episode of a program. In turn, the episode data object maps to one or more episodes to a show. An actors data object is mapped to each episode to identify actors. Also, a genres data object is used to classify shows in genres (e.g., comedy, drama, action, sports, etc.).

In one embodiment, the database for the networked PVR system comprises a relational database (e.g., key value pair database or standard query language ("SQL") database). For this embodiment, the database maps objects for storage in the relational database. Although one embodiment of the networked PVR system utilizes a relational database, other databases may be used without deviating from the spirit or scope of the invention.

Figure 15:
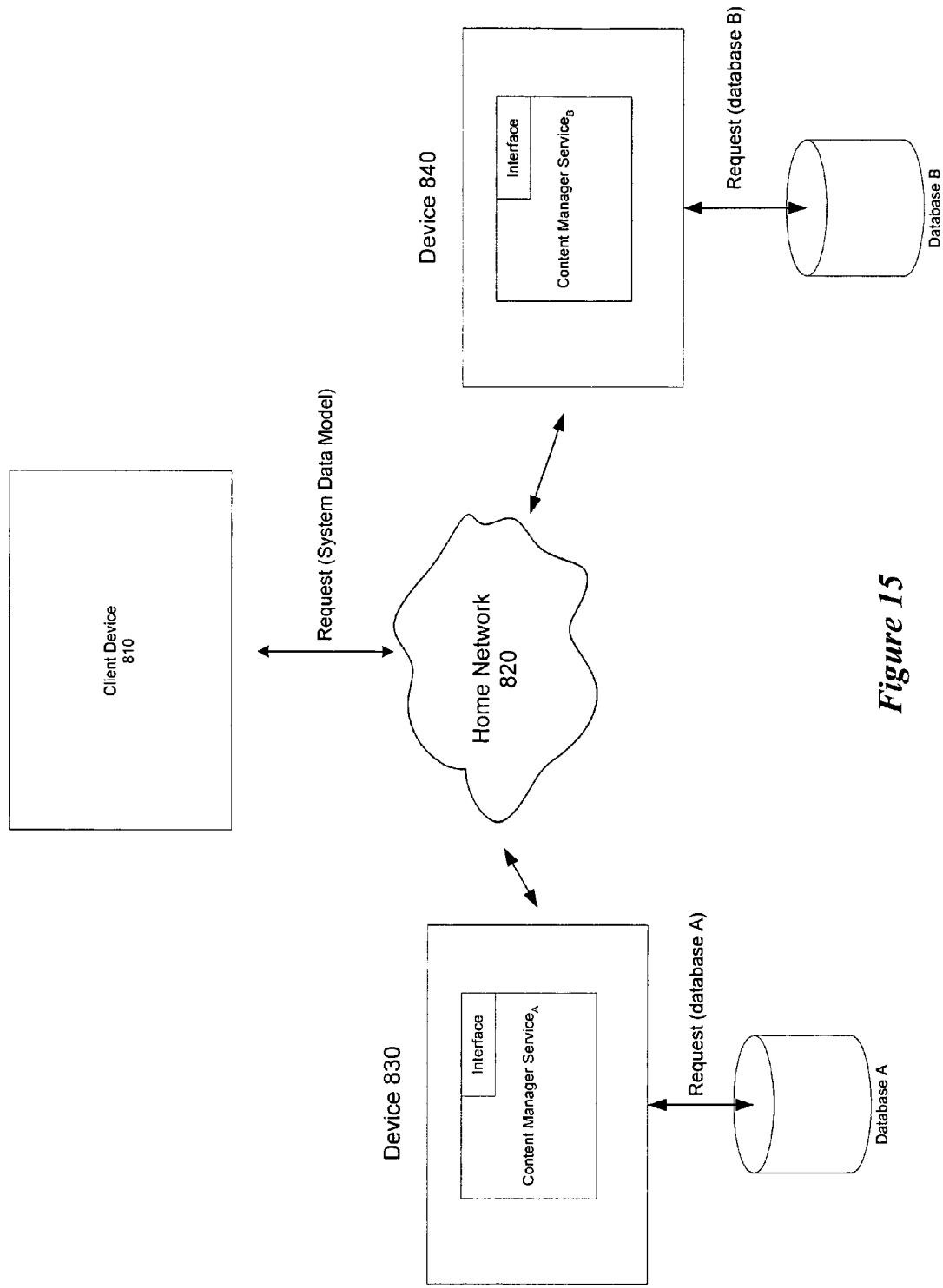
FIG. 15 is a block diagram illustrating one embodiment of accessing a data store through the networked PVR system.

FIG. 15 is a block diagram illustrating one embodiment of accessing a data store in the networked PVR system. A client device 1510 is connected to a home network 1520. As shown in FIG. 15, device 1530 and device 1540 are also coupled to home network 1520. Device 1540 includes a persistent data store, labeled Database B in FIG. 15. Similarly, device 1530 includes a persistent data store, Database A. Device 1530 and 1540 support a service that permits access to information in the persistent data stores. In one embodiment, the content manager service is used. Specifically, a first implementation of the content manager service$_A$ supports access to Database A, and a second implementation of the content manager service$_B$ supports access to Database B.

Client device 1510 may obtain information from Database A and Database B. To query Database B, client device 1510 obtains a connection with device 1540 in a manner as described above. The client device 1510 invokes methods via an interface on content manager service$_B$. For example, client device 1510 may desire to obtain a list of all genres recognized by the networked PVR system. This information may be stored in database B. Client device 1510 generates a request using data model parameters specified in the interface for content manager service$_B$. For the example above, client device 1510 generates a request to content manager service$_B$ to identify all objects with the type "genre." In response to the request, client manager service$_B$ translates the data model notion of "genre" to a query compatible with Database B. For example, if Database B supports SQL, then content manager service$_B$ generates a SQL request to Database B to obtain all records in a table with the type "genre."

The implementation of the content manager service performs the translation from the networked PVR system data model to an underlying database implementation. For the example in FIG. 15, the content manager service$_A$ supports a first translation to Database A, and the content manager service$_B$ supports a second translation for requests for data stored in Database B. Accordingly, client device 1510 uses the same request, as defined by the interface on both content manager services, to access different database implementations (e.g., Database A and Database B).

In one embodiment, the networked PVR system is implemented using a database. In general, the database stores objects, attributes associated with those objects, and associations between those objects. For example, the database stores an identification of television programs available within the media space. The database stores a plurality of attributes, so as to associate one or more attributes for each object. In one embodiment, the objects include. Thus, a track may be associated with one or more albums, one or more artists, one or more genres, and one or more playlists. Attributes include titles, creation dates, and multiple associated media files. Thus, a track may have associated album art, lyrics, etc.

The networked PVR system database permits classifying audio tracks in an extremely versatile manner. For example, a user may desire to classify a track or album (i.e., collection of tracks) in more than one genre because the user associates the music with two different types of genres (e.g., rock and blues). Also, a musical track may be a result of a collaboration between two artists. To properly classify the track, a user of the networked PVR system may associate the track with two different artists. As illustrated by the above examples, the networked PVR system provides m1imum flexibility in classifying and organizing music.

The networked PVR system handles each classification or item as a distinct object. For example, for the music jukeb13 application, playlists, genres, artists, albums, and tracks are all handled as individual objects. This feature, which supports independent objects for organization and classification of items, provides m1imum flexibility in organizing and classifying music. For example, the user may create nested playlists, such that a first playlist may be wholly contained within a second playlist. Prior art music systems only deal with playlists by tracks. For these prior art systems, a playlist only consists of tracks. In the networked PVR system, playlists may comprise any "objects." Therefore, playlists may be created from one or more artists, genres, albums or other playlists.

The use of objects in organizing and playing music also permits artists with the same name to be treated differently. Prior art digital music systems store metadata to identify artists. If a user executes a search on the metadata using these prior art systems, there is no way for the system to differentiate among artists with the same name. In the networked PVR system, each artist is treated as an object. Thus, two artists with the same name are two distinct objects, and may be manipulated as two separate artists.

The networked PVR system utilizes distributed iterators. A response to a query to a database may generate a huge amount of data. In one embodiment, the networked PVR system protocol supports transmitting a portion of the data, and maintaining a pointer to identify the data that has been sent. In one embodiment, the protocol uses iterators. The use of iterators by the networked PVR system allows the system to track a portion of data (e.g., a list) transferred from one device to another device. The iterator is implemented such that the iterator dynamically changes if items in the database change during transfer of the data. In general, the iterator specifies a position in an array. A list is a result from the database. For example, the response to a query to a database may produce a list of audio tracks. Subsequently, an audio track, extracted as part of the example query, may be deleted. In another scenario, an audio track, specified by the query, may be added to the database.

If the networked PVR system is implemented using the proprietary protocol and a TCP/IP network, the system associates state with the request for database information. This state information is utilized to maintain iterator information.

Although the present invention has been described in terms of specific exemplary embodiments, it will be appreciated that various modifications and alterations might be made by those skilled in the art without departing from the spirit and scope of the invention.

What is claimed is:

1. A method for networking a plurality of television recording devices, said method comprising the steps of:
   receiving a plurality of television signals;
   selecting a set of tuners from a plurality of tuners available on a home-based network, the selected set of tuners residing within the home-based network;
   tuning each of said television signals in one of the tuners selected from the plurality of tuners;
   buffering said television signals on a storage medium in at least one PVR media server, the PVR media server configured for maintaining a read position and a write position for the buffering,
   the PVR media server residing within the home-based networks,
   the buffering comprising a configurable type buffer that has a configurable size for permitting storage of a selectable time duration of the television signals,
   the configurable type buffer for providing buffering of the television signals continuously by using the selectable time duration;
   setting a set of boundary conditions for the read position and the write position;
   generating an event when the read position falls behind the write position an amount greater than the buffer size;
   advancing the read position in response to the generated event while the write position advanced as a television signal is received;
   coupling a plurality of clients, over the home-based network, to said PVR media server;
   assigning at least two of said clients to one or more of said tuners; and
   transferring, over said home-based network, buffered television signals to said clients.

2. The method as set forth in claim 1, wherein the step of tuning each of said television signals in one of a plurality of tuners comprises the step of tuning said television signals in a plurality of tuners located in a single PVR media server.

3. The method as set forth in claim 1, wherein the step of tuning each of said television signals in one of a plurality of tuners comprises the step of tuning said television signals in a plurality of tuners located in plurality PVR media servers.

4. The method as set forth in claim 1, wherein the step of buffering said television signals on a storage medium comprises the step of storing at least one television signal on a storage medium in at least one PVR media server for a client so as to record at least one television program for said client.

5. The method as set forth in claim 4, wherein the step of storing at least one television signal comprises the steps of:
    assigning a tuner to said client;
    allocating space on said storage medium to record said television program; and
    storing said television signal on said storage medium during a time scheduled for said television program.

6. The method as set forth in claim 4, wherein the step of storing at least one television signal comprises the step of resolving any conflicts to assign an available tuner for said television signal.

7. The method as set forth in claim 6, wherein the step of resolving any conflicts to assign an available tuner for said television program comprises the steps of:
    determining whether one of said tuners is available to receive said television signal;
    if so, assigning said tuner to receive said television signal;
    if not, determining which tuners are potentially available;
    querying clients assigned to said tuners potentially available to determine whether said clients desire to cancel recordation of said television program; and
    assigning a tuner potentially available to receive said television signal if no clients cancel recordation of said television program.

8. The method as set forth in claim 1, further comprising the steps of:
    generating a first position to identify a location within a selected one of said buffered television signals for a first client; and
    generating a second position to identify a location within said selected buffered television signal for a second client, said second position being independent from said first position.

9. A system comprising:
    a plurality of clients for displaying television signals;
    at least one PVR media server coupled to receive a plurality of television signals, said PVR media server comprising:
        a plurality of television tuners for tuning each of said television signals, so as to assign at least two of said clients to one or more of said tuners, thereby generating a set of assigned clients;
        a storage medium, coupled to said television tuners, for buffering said television signals, the PVR media server configured for maintaining a read position and a write position for the buffering,
        a configurable type buffer that has a configurable size for permitting storage of a selectable time duration of the television signals, the configurable type buffer for providing buffering of the television signals continuously by using the selectable time duration;
        a set of boundary conditions for the read position and the write position, the boundary conditions for generating an event when the read position falls behind the write position an amount greater than the buffer size, the event configured for causing the read position to advance in response to the generated event while the write position advanced as a television signal is received; and
    a home-based network for coupling said clients to said PVR media server and for transferring said buffered television signals to said assigned clients,
    wherein the system is configured for selecting a set of tuners for tuning the received signals, wherein the selected set of tuners is located within the home-based network,
    wherein the selected set of tuners are coupled to storage media for buffering the signals for the assigned clients, the storage media located within the home-based network.

10. The system as set forth in claim 9, wherein said at least one PVR media server comprises a single PVR media server comprising a plurality of tuners.

11. The system as set forth in claim 9, wherein said at least one PVR media server comprises a plurality of tuners located in a plurality of PVR media servers.

12. The system as set forth in claim 9, wherein said PVR media server further comprising storage medium for storing at least one television signal so as to record said television program.

13. The system as set forth in claim 12, wherein said system further comprises software for assigning a tuner to said client, for allocating space on said storage medium to record said television program, and for storing said television signal on said storage medium during a time scheduled for said television program.

14. The system as set forth in claim 12, wherein said system further comprises software for resolving any conflicts to assign an available tuner for said television signal.

15. The system as set forth in claim 14, further comprising software for determining whether one of said tuners is available to receive said television signal;
    if so, for assigning said tuner to receive said television signal;
    if not, for determining which tuners are potentially available, for querying clients assigned to said tuners potentially available to determine whether said clients desire to cancel recordation of said television program, and for assigning a tuner potentially available to receive said television signal if no clients cancel recordation of said television program.

16. The system as set forth in claim 12, further comprising software for generating a first position to identify a location within a selected one of said buffered television signals for a first client, and for generating a second position to identify a location within, said selected buffered television signal for a second client, said second position being independent from said first position.

17. A method of networking video recording devices, the method comprising:
    receiving a plurality of signals, thereby generating a set of received signals;
    selecting a plurality of tuners located within a home-based network;
    tuning the received signals by using the tuners selected within the home-based network;
    coupling the tuners to a plurality of storage media located within the home-based network;
    buffering the received signals by using a first storage medium in at least a first PVR media server thereby generating a set of buffered signals, the first PYR media server configured for maintaining a read position and a write position for the buffering,
    the buffering comprising a configurable type buffer that has a configurable size for permitting storage of a selectable time duration of the television signals, the configurable type buffer for providing buffering of the television signals continuously by using the selectable time duration, the first PVR media server located within the home-based network;

setting a set of boundary conditions for the read position and the write position;

generating an event when the read position falls behind the write position an amount greater than the buffer size; and advancing the read position in response to the generated event while the write position advanced as a television signal is received.

18. The method of claim 17, further comprising:

selecting a first tuner for a first received signal, wherein the step of selecting comprises the step of resolving conflicts relating to the selecting, wherein the first tuner comprises an available tuner on the network;

coupling the first tuner to the first storage medium;

allocating space on the first storage medium to record received signals; and storing the first received signal on the first storage medium during a predetermined time.

19. The method of claim 18, wherein the step of resolving conflicts to select an available tuner comprises the steps of:

determining whether the first tuner is available to receive a signal;

if so, selecting the first tuner to receive the signal;

if not, determining a second tuner that is potentially available for selection;

determining whether the second tuner has assigned clients;

if the second tuner has assigned clients, querying the clients assigned to the second tuner to determine whether the assigned clients permit reassignment of the second tuner; and if reassignment is permitted, selecting the second tuner to receive the received signal, if reassignment is not permitted, then searching for a third tuner available for selection on the network.

20. The method of claim 17, further comprising:

selecting tuners located within the first PVR media server within the network, the first PVR media server comprising a plurality of tuners;

coupling a plurality of clients, by using the network, to the first PVR media server;

assigning at least a first client and a second client to at least a first tuner and a second tuner; and transferring, over the network, the buffered signals to the first and second clients.

21. The method of claim 17, further comprising the step of selecting a plurality of tuners located in a plurality of PVR media servers distributed over the network.

* * * * *